US012175396B2

(12) United States Patent
Warmoth et al.

(10) Patent No.: US 12,175,396 B2
(45) Date of Patent: Dec. 24, 2024

(54) SYSTEMS AND METHODS FOR FACILITATING AERIAL VEHICLE SERVICES

(71) Applicant: Joby Aero, Inc., Santa Cruz, CA (US)

(72) Inventors: Adam Warmoth, Los Angeles, CA (US); Christopher Hill Courtney, Half Moon Bay, CA (US); Ian Andreas Villa, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

(21) Appl. No.: 18/393,994

(22) Filed: Dec. 22, 2023

(65) Prior Publication Data
US 2024/0211824 A1 Jun. 27, 2024

Related U.S. Application Data

(63) Continuation of application No. 17/463,885, filed on Sep. 1, 2021, now Pat. No. 11,893,521.
(Continued)

(51) Int. Cl.
*G06Q 10/0631* (2023.01)
*G06Q 50/40* (2024.01)

(52) U.S. Cl.
CPC ......... *G06Q 10/0631* (2013.01); *G06Q 50/40* (2024.01)

(58) Field of Classification Search
CPC .......................... G06Q 10/0631; G06Q 50/40
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2698749 A1 2/2014
(Continued)

OTHER PUBLICATIONS

Bennaceur et al., "Passenger-centric urban air mobility: Fairness trade-offs and operational efficiency", Transportation Research: Emerging Technologies, 2021, 29 pages.
(Continued)

*Primary Examiner* — Colby M Hansen
(74) *Attorney, Agent, or Firm* — Dority and Manning, P.A.

(57) ABSTRACT

Systems and methods for facilitating aerial vehicle services are provided. A service entity system can obtain multi-modal transportation services data indicative of a plurality of anticipated aerial transportation service. The service entity system can obtain vehicle attributes associated vehicle(s) of an aerial vehicle provider and determine an expected performance of the vehicle(s) based on the vehicle attributes and the anticipated aerial transportation services. The service entity system can generate an aerial vehicle service request that requests access to the vehicle(s) for providing aerial transportation services for the service entity based on the expected performance of the vehicle(s). A vehicle provider system can obtain a number of different aerial vehicle service requests from a number of different service entities. The vehicle provider system can select portions of the different aerial vehicle service requests to accept and provide access to vehicle(s) of the vehicle provider based on the selected portions.

19 Claims, 10 Drawing Sheets

Related U.S. Application Data

(60) Provisional application No. 63/073,178, filed on Sep. 1, 2020.

(58) Field of Classification Search
USPC .......................................................... 705/7.13
See application file for complete search history.

(56) References Cited

U.S. PATENT DOCUMENTS

| | | | |
|---|---|---|---|
| 5,823,468 A | 10/1998 | Bothe | |
| 5,839,691 A | 11/1998 | Lariviere | |
| 5,842,667 A | 12/1998 | Jones | |
| 6,343,127 B1 | 1/2002 | Billoud | |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,663,237 B2 | 5/2017 | Senkel et al. | |
| 9,694,911 B2 | 7/2017 | Bevirt et al. | |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,816,529 B2 | 11/2017 | Grissom et al. | |
| 9,838,436 B2 | 12/2017 | Michaels | |
| 10,004,652 B1* | 6/2018 | Groden | G08G 5/0034 |
| 10,140,873 B2 | 11/2018 | Adler et al. | |
| 10,152,894 B2 | 12/2018 | Adler et al. | |
| 10,216,190 B2 | 2/2019 | Bostick et al. | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,593,215 B2 | 3/2020 | Villa | |
| 10,593,217 B2 | 3/2020 | Shannon | |
| 10,752,365 B2 | 8/2020 | Galzin | |
| 10,759,537 B2 | 9/2020 | Moore et al. | |
| 10,768,201 B2 | 9/2020 | Luo et al. | |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 2010/0079342 A1 | 4/2010 | Smith et al. | |
| 2014/0179535 A1 | 6/2014 | Stückl et al. | |
| 2016/0311529 A1 | 10/2016 | Brotherton-Ratcliffe et al. | |
| 2017/0197710 A1 | 7/2017 | Ma | |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0214324 A1* | 8/2018 | Groden | G05D 1/0808 |
| 2018/0216988 A1 | 8/2018 | Nance | |
| 2018/0308366 A1 | 10/2018 | Goel et al. | |
| 2018/0354636 A1 | 12/2018 | Darnell et al. | |
| 2019/0146508 A1 | 5/2019 | Dean et al. | |
| 2019/0221127 A1 | 7/2019 | Shannon | |
| 2019/0316849 A1 | 10/2019 | Abrego et al. | |
| 2020/0090255 A1 | 3/2020 | Bravo et al. | |
| 2020/0103922 A1 | 4/2020 | Nonami et al. | |
| 2020/0182637 A1 | 6/2020 | Kumar et al. | |
| 2020/0388166 A1 | 12/2020 | Rostamzadeh et al. | |
| 2021/0082208 A1 | 3/2021 | Surace | |
| 2021/0157561 A1 | 5/2021 | Gilton | |
| 2021/0229808 A1* | 7/2021 | Sikora | B64D 9/00 |
| 2021/0398054 A1 | 12/2021 | Jaggers et al. | |
| 2022/0327583 A1 | 10/2022 | Fotso et al. | |
| 2023/0068989 A1* | 3/2023 | Zeng | H04W 12/06 |
| 2024/0037487 A1* | 2/2024 | Clise | B64D 1/12 |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

800

- 805 — OBTAIN MULTI-MODAL TRANSPORTATION SERVICE DATA ASSOCIATED WITH A SERVICE ENTITY, WHEREIN THE MULTI-MODAL TRANSPORTATION SERVICE DATA IS INDICATIVE OF ONE OR MORE MULTI-MODAL TRANSPORTATION SERVICES ASSOCIATED WITH ONE OR MORE AERIAL TRANSPORTATION LEGS, WHEREIN EACH OF THE ONE OR MORE MULTI-MODAL TRANSPORTATION SERVICES COMPRISE AT LEAST TWO TRANSPORTATION LEGS, EACH OF THE AT LEAST TWO TRANSPORTATION LEGS COMPRISING A RESPECTIVE AERIAL TRANSPORTATION LEG OF THE ONE OR MORE AERIAL TRANSPORTATION LEGS

- 810 — OBTAIN ONE OR MORE AERIAL VEHICLE ATTRIBUTES ASSOCIATED WITH ONE OR MORE AERIAL VEHICLES, WHEREIN THE ONE OR MORE AERIAL VEHICLES ARE ASSOCIATED WITH AN AERIAL VEHICLE PROVIDER

- 815 — DETERMINE, FOR THE ONE OR MORE AERIAL VEHICLES, PREDICTED AERIAL VEHICLE PERFORMANCE DATA ASSOCIATED WITH THE ONE OR MORE AERIAL TRANSPORTATION LEGS OF THE ONE OR MORE MULTI-MODAL TRANSPORTATION SERVICES BASED, AT LEAST IN PART, ON THE MULTI-MODAL TRANSPORTATION SERVICE DATA AND THE ONE OR MORE VEHICLE ATTRIBUTES

- 820 — GENERATE AN AERIAL VEHICLE SERVICE REQUEST FOR THE AERIAL VEHICLE PROVIDER BASED, AT LEAST IN PART, ON THE PREDICTED AERIAL VEHICLE PERFORMANCE DATA, WHEREIN THE AERIAL VEHICLE SERVICE REQUEST COMPRISES A REQUEST FOR AT LEAST ONE OF THE ONE OR MORE AERIAL VEHICLES ASSOCIATED WITH THE AERIAL VEHICLE PROVIDER TO PROVIDE AN AERIAL TRANSPORTATION SERVICE FOR AT LEAST ONE OF THE ONE OR MORE AERIAL TRANSPORTATION LEGS

- 825 — OUTPUT DATA INDICATIVE OF THE AERIAL VEHICLE SERVICE REQUEST FOR THE AERIAL VEHICLE PROVIDER

| 905 | OBTAIN DATA INDICATIVE OF A FIRST CANDIDATE AERIAL TRANSPORTATION SERVICE FOR ONE OR MORE AERIAL VEHICLES OF AN AERIAL VEHICLE PROVIDER, WHEREIN THE FIRST CANDIDATE AERIAL TRANSPORTATION SERVICE IS ASSOCIATED WITH A FIRST SERVICE ENTITY, AND WHEREIN THE FIRST CANDIDATE AERIAL TRANSPORTATION SERVICE IS ASSOCIATED WITH THE PROVISION OF ONE OR MORE MULTI-MODAL TRANSPORTATION SERVICES OF THE FIRST SERVICE ENTITY |

↓

| 910 | OBTAIN DATA INDICATIVE OF A SECOND CANDIDATE AERIAL TRANSPORTATION SERVICE FOR THE ONE OR MORE AERIAL VEHICLES OF THE AERIAL VEHICLE PROVIDER, WHEREIN THE SECOND CANDIDATE AERIAL TRANSPORTATION SERVICE IS ASSOCIATED WITH A SECOND SERVICE ENTITY |

↓

| 915 | DETERMINE A SELECTED AERIAL TRANSPORTATION SERVICE FOR THE ONE OR MORE AERIAL VEHICLES OF THE AERIAL VEHICLE PROVIDER BASED AT LEAST IN PART ON THE FIRST CANDIDATE AERIAL TRANSPORTATION SERVICE AND THE SECOND CANDIDATE AERIAL TRANSPORTATION SERVICE |

↓

| 920 | COMMUNICATE DATA INDICATIVE OF THE SELECTED AERIAL TRANSPORTATION SERVICE |

FIG. 9

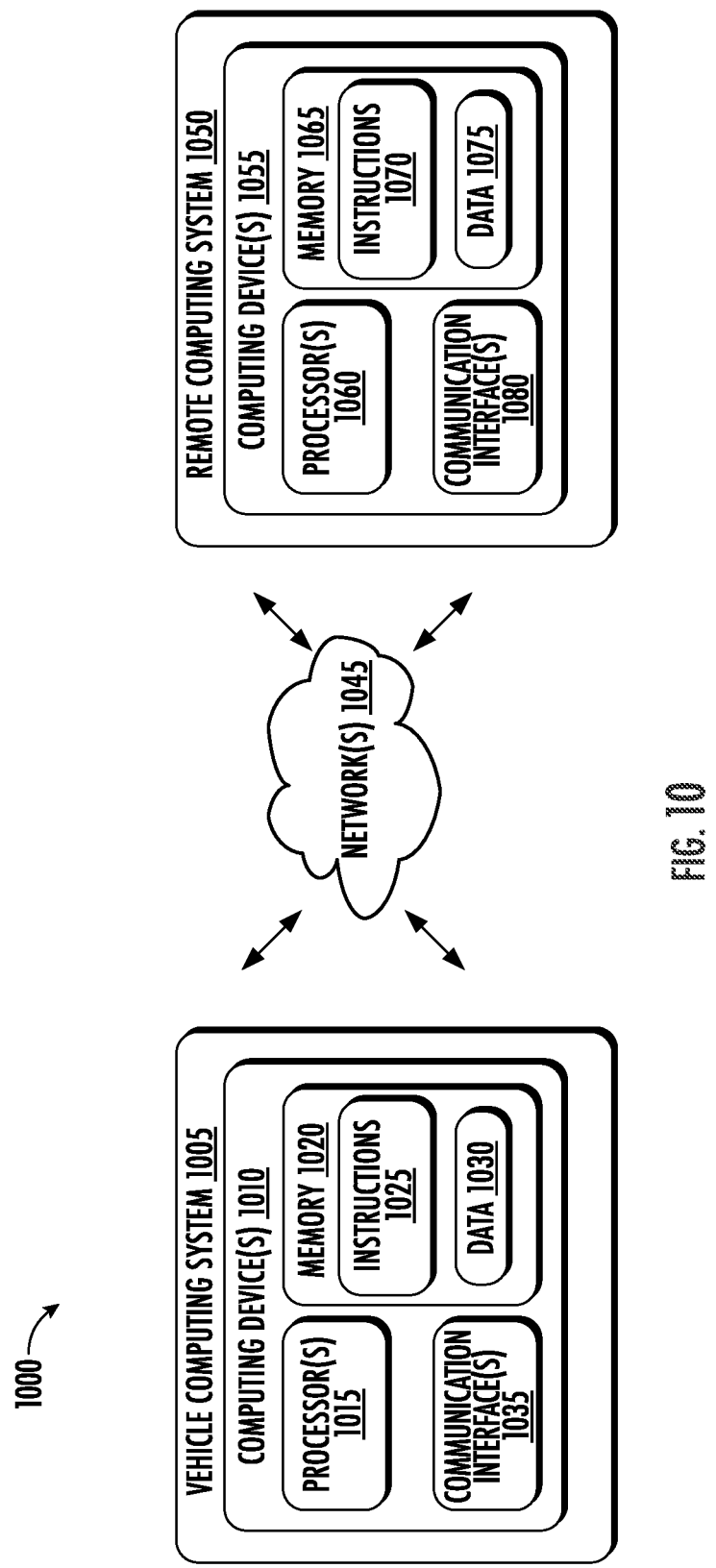

SYSTEMS AND METHODS FOR FACILITATING AERIAL VEHICLE SERVICES

PRIORITY CLAIM

The present application is a continuation of U.S. application Ser. No. 17/463,885, filed on Sep. 1, 2021, which claims the benefit of U.S. Provisional Application No. 63/073,178, filed on Sep. 1, 2020, each of which is incorporated in its entirety by this reference.

FIELD

The present disclosure relates generally to vehicle services and, more particularly, facilitating vehicle services.

BACKGROUND

A wide variety of modes of transport are available within cities. For example, people can walk, ride a bike, drive a car, take public transit, or use a ride sharing service. As population densities and demand for land increase, however, many cities are experiencing problems with traffic congestion and the associated pollution. Consequently, there is a need to expand the available modes of transport in ways that can reduce the amount of traffic without requiring the use of large amounts of land. Air travel within cities can reduce travel time over purely ground-based approaches and alleviate problems associated with traffic congestion. Vertical takeoff and landing (VTOL) aircraft provide opportunities to incorporate aerial transportation into transport networks for cities and metropolitan areas. VTOL aircraft require much less space to take-off and land than other types of aircraft, making them more suitable for densely populated urban environments. Pooling a number of third-party aircraft to complete transportation services, however, still presents a variety of challenges.

SUMMARY

Aspects and advantages of implementations of the present disclosure will be set forth in part in the following description, or may be learned from the description, or may be learned through practice of the implementations.

Aspects of the present disclosure are directed to computing system including one or more processors and one or more tangible, non-transitory, computer readable media that collectively store instructions that when executed by the one or more processors cause the computing system to perform operations. The operations include obtaining multi-modal transportation service data associated with a service entity. The multi-modal transportation service data can be indicative of one or more multi-modal transportation services associated with one or more aerial transportation legs. Each of the one or more multi-modal transportation services can include at least two transportation legs. Each of the at least two transportation legs can include a respective aerial transportation leg of the one or more aerial transportation legs. The operations can include obtaining one or more aerial vehicle attributes associated with one or more aerial vehicles. The one or more aerial vehicles can be associated with an aerial vehicle provider. The operations can include determining, for the one or more aerial vehicles, predicted aerial vehicle performance data associated with the one or more aerial transportation legs of the one or more multi-modal transportation services based, at least in part, on the multi-modal transportation service data and the one or more vehicle attributes. The operations can include generating an aerial vehicle service request for the aerial vehicle provider based, at least in part, on the predicted aerial vehicle performance data. The aerial vehicle service request can include a request for at least one of the one or more aerial vehicles associated with the aerial vehicle provider to provide an aerial transportation service for the service entity. The operations can include outputting data indicative of the aerial vehicle service request for the aerial vehicle provider.

Another aspect of the present disclosure is directed to another computing system including one or more processors and one or more tangible, non-transitory, computer readable media that collectively store instructions that when executed by the one or more processors cause the computing system to perform operations. The operations include obtaining data indicative of a first candidate aerial transportation service for one or more aerial vehicles of an aerial vehicle provider. The first candidate aerial transportation service can be associated with a first service entity. The first candidate aerial transportation service can be associated with the provision of one or more multi-modal transportation services of the first service entity. The operations can include obtaining data indicative of a second candidate aerial transportation service for the one or more aerial vehicles of the aerial vehicle provider. The second candidate aerial transportation service can be associated with a second service entity. The operations can include determining a selected aerial transportation service for the one or more aerial vehicles of the aerial vehicle provider based at least in part on the first candidate aerial transportation service and the second candidate aerial transportation service. And, the operations can include communicating data indicative of the selected aerial transportation service.

Another aspect of the present disclosure is directed to a computer-implemented method. The method includes obtaining, by a computing system including one or more computing devices, multi-modal transportation service data associated with a service entity. The multi-modal transportation service data can be indicative of one or more multi-modal transportation services associated with one or more aerial transportation legs. Each of the one or more multi-modal transportation services can include at least two transportation legs. The at least two transportation legs can include a respective aerial transportation leg of the one or more aerial transportation legs. The method can include obtaining, by the computing system, one or more aerial vehicle attributes associated with one or more aerial vehicles. The one or more aerial vehicles can be associated with an aerial vehicle provider. The method can include determining, by the computing system, for the one or more aerial vehicles, predicted aerial vehicle performance data associated with the one or more aerial transportation legs of the one or more multi-modal transportation services based, at least in part, on the multi-modal transportation service data and the one or more vehicle attributes. The method can include generating, by the computing system, an aerial vehicle service request for the aerial vehicle provider based, at least in part, on the predicted aerial vehicle performance data. And, the method can include outputting, by the computing system, data indicative of the aerial vehicle service request for the aerial vehicle provider.

Another aspect of the present disclosure is directed to another computer-implemented method. The method can include obtaining, by a vehicle provider computing system including one or more computing devices, data indicative of a first candidate aerial transportation service for one or more aerial vehicles of an aerial vehicle provider. The first candidate aerial transportation service can be associated with a first service entity. The first candidate aerial transportation service can be associated with the provision of one or more multi-modal transportation services of the first service entity. The method can include obtaining, by the vehicle provider computing system, data indicative of a second candidate aerial transportation service for the one or more aerial vehicles of the aerial vehicle provider. The second candidate aerial transportation service can be associated with a second service entity. The method can include determining, by the vehicle provider computing system, a selected aerial transportation service for the one or more aerial vehicles of the aerial vehicle provider based at least in part on the first candidate aerial transportation service and the second candidate aerial transportation service. And, the method can include communicating, by the vehicle provider computing system, data indicative of the selected aerial transportation service.

Yet another aspect of the present disclosure is directed to one or more tangible, non-transitory computer-readable media storing computer-readable instructions that when executed by one or more processors cause the one or more processors to perform operations. The operations can include obtaining multi-modal transportation service data associated with a service entity. The multi-modal transportation service data can be indicative of one or more multi-modal transportation services associated with one or more aerial transportation legs. Each of the one or more multi-modal transportation services can include at least two transportation legs. The at least two transportation legs can include a respective aerial transportation leg of the one or more aerial transportation legs. The operations can include obtaining one or more aerial vehicle attributes associated with one or more aerial vehicles. The one or more aerial vehicles can be associated with an aerial vehicle provider. The operations can include determining for the one or more aerial vehicles, a predicted aerial vehicle performance data associated with the one or more multi-modal transportation services based, at least in part, on the multi-modal transportation service data and the one or more vehicle attributes. The operations can include generating an aerial vehicle service request for the aerial vehicle provider based, at least in part, on the predicted aerial vehicle performance data. The aerial vehicle service request can include at least a first portion of the predicted aerial vehicle performance data. And, the operations can include outputting data indicative of the aerial vehicle service request for the aerial vehicle provider.

Yet another aspect of the present disclosure is directed to one or more tangible, non-transitory computer-readable media storing computer-readable instructions that when executed by one or more processors cause the one or more processors to perform operations. The operations can include obtaining, by a vehicle provider computing system including one or more computing devices, data indicative of a first candidate aerial transportation service for one or more aerial vehicles of an aerial vehicle provider. The first candidate aerial transportation service can be associated with a first service entity. The first candidate aerial transportation service can be associated with the provision of one or more multi-modal transportation services of the first service entity. The operations can include obtaining, by the vehicle provider computing system, data indicative of a second candidate aerial transportation service for the one or more aerial vehicles of the aerial vehicle provider. The second candidate aerial transportation service can be associated with a second service entity. The operations can include determining, by the vehicle provider computing system, a selected aerial transportation service for the one or more aerial vehicles of the aerial vehicle provider based at least in part on the first candidate aerial transportation service and the second candidate aerial transportation service. And, the operations can include communicating, by the vehicle provider computing system, data indicative of the selected aerial transportation service.

Other aspects of the present disclosure are directed to various systems, apparatuses, non-transitory computer-readable media, user interfaces, and electronic devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 8 depicts a flow diagram of an example method for generating a vehicle service request according to example embodiments of the present disclosure;

FIG. 9 depicts a flow diagram of an example method for selecting a vehicle service request according to example embodiments of the present disclosure; and FIG. 10 depicts a block diagram of an example computing system according to example embodiments of the present disclosure.

DETAILED DESCRIPTION

Figure 1:
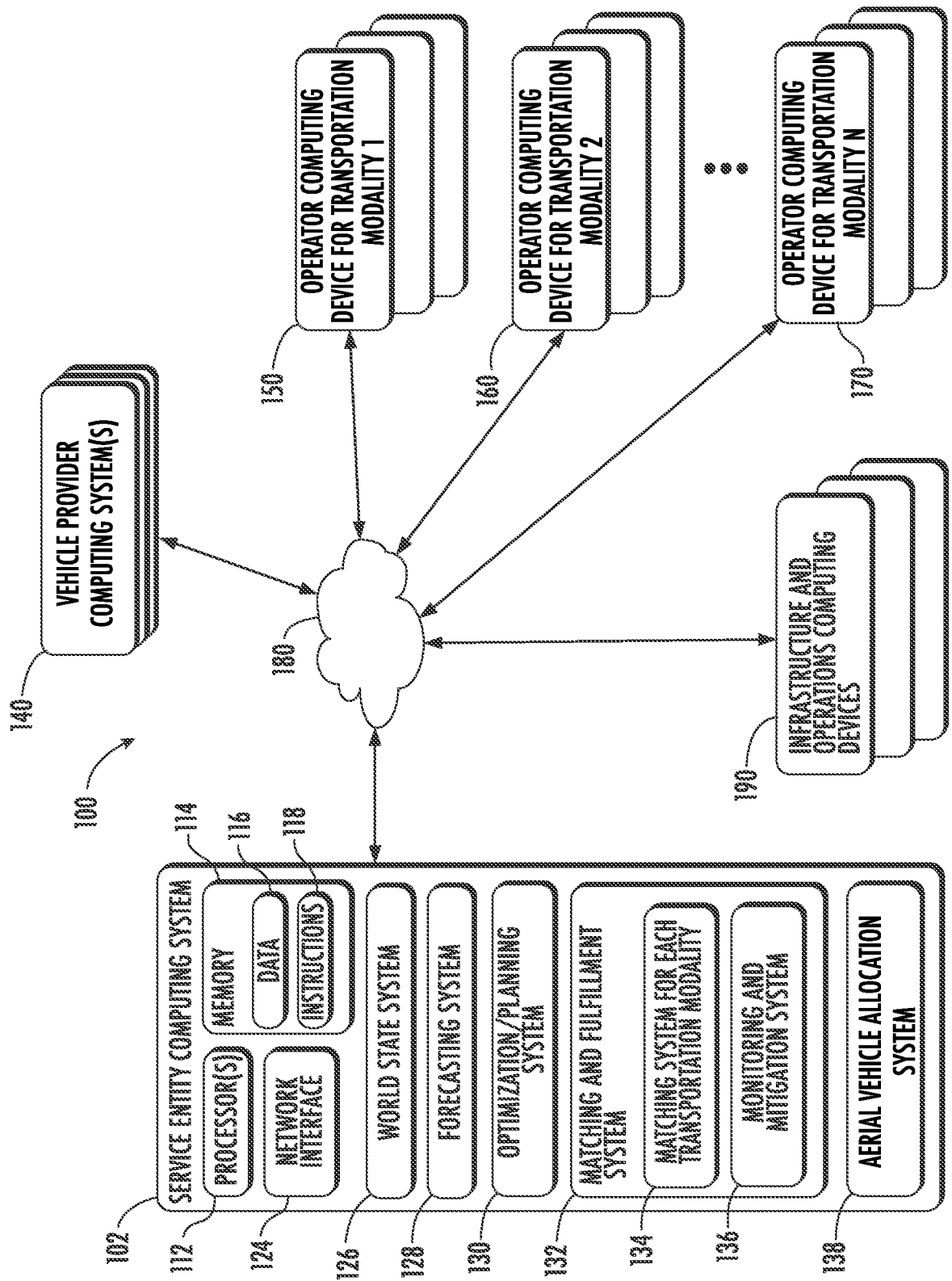
FIG. 1 depicts a block diagram of an example computing system according to example embodiments of the present disclosure.

Aspects of the present disclosure are directed to improved systems and methods for facilitating aerial vehicle services. In particular, aspects of the present disclosure are directed to computing systems configured to create, select, and track targeted aerial vehicle service requests for multi-modal transportation services. For instance, a service entity can manage and/or coordinate a plurality of different types of vehicles to provide services to a plurality of users via a transportation platform. By way of example, a user may generate a service request for transportation from an origin location to a destination location. A service entity computing system associated with the service entity (e.g., a cloud-based operations computing, etc.) can obtain data indicative of the service request and generate an itinerary to facilitate transporting the user from the origin location to the destination location. The itinerary can be a multi-modal transportation itinerary for facilitating a multi-modal transportation service. The multi-modal transportation service can include at least two types of transportation services such as, for example, ground-based vehicle transportation services and/or an aerial transportation services. For example, the itinerary can include three legs: a first leg that includes a ground-based vehicle transporting the user from the origin location (e.g., a home, etc.) to a first aerial transport facility; a second leg (e.g., an aerial portion) that includes an aerial vehicle transporting the user from the first aerial transport facility to a second aerial transport facility; and/or a third leg that includes another ground-based vehicle transporting the user from the second aerial transport facility to the destination location (e.g., a conference center). Transportation service(s) can be provided in accordance with the multi-modal transportation itinerary to facilitate the transportation of the user from the origin location to the destination location.

The transportation service(s) can be performed by vehicles of the service entity or vehicles provided by third-party vehicle providers associated with the service entity. The third-party aerial vehicle providers can include fleet(s) of aerial vehicles that can be assigned, operated, or otherwise provided to the service entity or other third-party service providers to perform aerial transportation service(s). The third-party aerial vehicle providers can selectively provide access of their vehicle(s) to the service entity or other service providers based on service requests from the service entity or the other service providers.

The technology of the present disclosure provides improved approaches for generating targeted aerial vehicle service requests, selecting between various aerial vehicle service requests, and tracking and predicting performance metrics of aerial transportation services. To do so, a service entity computing system (e.g., an operations computing system) can obtain multi-modal transportation service data indicative of a number of on-demand, scheduled, or anticipated requests for multi-modal transportation services. The service entity computing system can obtain a number of vehicle attributes associated with one or more aerial vehicle(s) of an aerial vehicle provider and determine predicted aerial vehicle performance data (e.g., an expected flight time, downtime, compensation, number of flights, etc.) for the vehicle(s) based on the vehicle attributes and the multi-modal transportation service data. The service entity computing system can generate a targeted aerial vehicle service request for the aerial vehicle provider based on the predicted aerial vehicle performance data and provide the targeted aerial vehicle service request to a vehicle provider computing system (e.g., a pilot device, vehicle device, aerial service provider device, etc.) associated with the aerial vehicle provider. The targeted aerial vehicle service request can include a request for one or more of the aerial vehicle provider's vehicle(s) to provide one or more aerial transportation service(s). In some implementations, the request can include a portion of the aerial vehicle performance data that is specifically targeted for the aerial vehicle provider based on the aerial vehicle provider's preferences (e.g., acceptance history, etc.) and/or other provider attributes. If accepted, the portion of the predicted aerial performance data can be periodically updated during the performance of the requested transportation service(s) to reflect updated expectations based on real-time data.

The vehicle provider computing system (e.g., the pilot, vehicle, or aerial service provider device, etc.) can obtain data indicative of a first candidate transportation service associated with the service entity (e.g., via the targeted aerial vehicle service request) and a second candidate transportation service associated with another service provider. The data for each candidate transportation service can include a request for vehicle(s) of the aerial vehicle provider to perform a number of aerial transportation services over an operational time frame (e.g., go online) for a respective service entity. The vehicle provider computing system can determine a selected aerial transportation service for the vehicle(s) of the aerial vehicle provider to provide one or more of the requested aerial transportation services and communicate data indicative of the selected aerial transportation service to the service entity and/or another service provider. The vehicle provider computing system can facilitate the communication between the vehicle provider computing system and a respective service provider computing system (e.g., pilot device, vehicle device, vehicle provider device, etc.) by accessing an application programming interface associated with the respective service provider. In this way, the vehicle provider computing system can obtain instructions for performing the selected aerial transportation services and, in some cases, updated predicted performance data during the course of the selected aerial transportation services. In this manner, the systems and methods of the present disclosure provide improved techniques for leveraging multi-modal transportation service data and vehicle attributes to generate a new type of targeted transportation service request specifically tailored to each of a number of third-party vehicle providers. This, in turn, enables the system to efficiently acquire third-party aerial vehicles for the performance of anticipated aerial transportation services, while enabling third-party vehicle providers to make informed decisions based on information provided by the narrowly tailored request.

More particularly, a service entity can be associated with a service entity computing system (e.g., a cloud-based operations computing system, etc.) that is configured to manage, coordinate, and/or dynamically adjust a multi-modal transportation service via a transportation platform. The transportation platform, for example, can be communicatively connected over a network to a plurality of users (e.g., via one or more user devices such as the first user device, etc.), a plurality service providers (e.g., via one or more service provider devices), one or more vehicle operators (e.g., providing vehicles for use on the platform), etc. The multi-modal transportation service can include a plurality of transportation legs, one of which (e.g., a second transportation leg) can include an aerial transport of a user. For example, the service entity computing system can obtain a request for a transportation service. The request for the transportation service can include at least a request for an aerial transport of a user of the transportation platform.

The request can specify an origin location and/or a destination location. In addition, in some implementations, the request can include an "arrive by" date and/or time at which the user desires to arrive at the requested destination. In some implementations, the request can indicate a "depart at" date and/or time that the user would like to depart. In some examples, the "depart at" date and/or time can be assumed to be the current date and/or time unless specified otherwise. Additional entries can specify a required number of seats, a preferred vehicle types (e.g., luxury vs. economy, humanly-operated vs. autonomous, etc.), an estimated payload weight (e.g., passengers and/or object weight, etc.), a preferred payload capacity (e.g., so that the vehicle accommodates the weight of any objects accompanying the user, etc.), maximum price, and/or various other characteristics.

A multi-modal transportation itinerary can be generated based on a request for the transportation service. The multi-modal transportation itinerary can include two or more transportation legs (e.g., a first transportation leg, a second transportation leg, a third transportation leg, etc.) between an origin and/or destination location specified in the request. The two or more transportation legs can include travel via two or more different transportation modalities such as, for example: cars, motorcycles, light electric vehicles (e.g., electric bicycles, scooters, etc.), buses, trains, aircraft (e.g., airplanes, helicopters, etc.), watercraft, walking, and/or other transportation modalities. Example aircrafts can also include helicopters and/or other vertical take-off and landing aircraft (VTOL) such as electric vertical take-off and landing aircraft (eVTOL). The vehicles can include non-autonomous, semi-autonomous, and/or fully-autonomous vehicles. In some implementations, one or more vehicles can be provided by a vehicle provider so that the vehicle(s) can be utilized by the transportation platform for the provision of transportation services for one or more legs.

The vehicles can be provided and/or maintained by one or more vehicle providers. For instance, each vehicle can include a service entity vehicle provided and/or maintained by the service entity and/or a third-party vehicle provided and/or maintained by a third-party vehicle provider. As described herein, the service entity computing system can provide cross-platform support to third-party vehicle providers, vehicle operators (e.g., pilots, drivers, etc.), and/or other computing systems associated with the third-party vehicle providers. For instance, the service entity computing system can provide access to one or more services of the service entity computing system to systems (e.g., third-party vehicle computing systems, third-party air traffic control systems, etc.) associated with third-party vehicle providers.

In response to a user's request, the service entity computing system can perform one or more algorithms to generate an itinerary for the user. As an example, the service entity computing system can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first).

More particularly, in some implementations, one or more of the transportation modalities can operate according to or within a fixed transportation infrastructure in which the ability of passengers to embark and disembark vehicles is constrained to a defined set of transportation nodes. For instance, the fixed transportation infrastructure can include a plurality of aerial vehicles (e.g., service entity aircraft, third-party aircraft, etc.) that operate within a ride sharing network facilitated by the service entity computing system. The aerial vehicle(s) can be constrained to load and unload passengers only at a defined set of physical take-off and/or landing areas which may in some instances be referred to as aerial transport facilities. Each aerial transport facility can include one or more landing pads and/or other infrastructure to enable passengers to safely embark or disembark from aerial vehicles. Aerial transport facilities can also include charging equipment, cooling equipment, re-fueling equipment, and/or other infrastructure for enabling aircraft operation and maintenance.

The service entity computing system can pre-determine a number of planned transportation services by the vehicle and/or service providers. For example, in some implementations, aerial vehicles of a ride-sharing network (e.g., service entity vehicles, third-party vehicles, etc.) can be scheduled and/or otherwise controlled by the service entity computing system in accordance with the ride sharing network. For instance, the service entity computing system can generate (e.g., on a daily basis) an initial pre-defined set of flight plans for the aerial vehicles of the ride-sharing network and can add and/or remove passengers from each planned flight. In some implementations, the service entity computing system can dynamically optimize (e.g., via an optimization and planning system) planned transportation services by the service providers to account for real-time changes in rider availability and demand. For example, the computing system can dynamically modify the pre-determined flight plans (e.g., delay a planned flight departure by five minutes and/or change a planned flight to an alternative arrival transportation node).

In some implementations, a transportation modality does not have pre-determined plans but instead operates in an "on-demand" nature. In such a case, the service entity computing system can match (e.g., via a matching and fulfillment system, etc.) the user with a service provider for the transportation modality from a free-floating, dynamic pool of independent transportation vehicle and/or service providers. For example, vehicle providers can dynamically opt in and out of the ride sharing network and the service entity computing system can operate to match the passenger with a vehicle provider who is currently opted into the network. The vehicle provider can choose to provide the service to the passenger or decline to provide the service. For example, for flight modalities, the service entity computing system can match the user to one of a dynamically changing pool of aerial vehicles and the aerial vehicles (e.g., a pilot of an aerial vehicle, a vehicle provider associated with the aerial vehicle, etc.) can choose (e.g., via one or more functional calls to a matching and fulfillment system) to provide or decline the proposed aerial transportation service.

The service entity computing system can include a number of subsystems configured to provide a plurality of backend services to facilitate a transportation service. By way of example, an optimization/planning system can provide a backend itinerary service to generate one or more itineraries for a user in accordance with the procedures described herein. In addition, the optimization/planning system can provide a backend routing service to determine one or more flight plans, routes, skylanes, etc. for vehicles associated with a transportation service. Moreover, the service entity computing system can include a world state system, a forecasting system, a simulation system and/or other systems configured to make future looking predictions for an operational time period. As one example, a world state system can operate a state monitoring system to maintain data descriptive of a current state of the world (e.g., a predicted transportation demand, flight assignments, operational statuses and locations of a plurality of vehicles, etc.). For instance, the world state system can be configured to obtain world state data through communication (e.g., via an API platform) with one or more vehicles, vehicle providers, and/or any other transportation entity associated with the service entity computing system. As another example, a forecasting system can operate a forecasting service to generate predictions of transportation demand, weather forecasts, and/or any other future looking data helpful for completing a transportation service.

The service entity computing system can interact with various vehicle providers (e.g., third-party vehicle providers, service entity vehicle providers, etc.) to obtain access to aerial vehicles for performing expected transportation services. To do so, the service entity computing system can include an application programming interface platform to facilitate services between the service entity infrastructure (e.g., the services of the service entity computing system, service entity service providers, etc.) and third-party vehicle providers. The API platform can include one or more functional calls to the backend services of the service entity computing system. By way of example, the one or more functional calls can be configured to communicate a request and/or data between one or more subsystems (e.g., world state system, forecasting system, optimization/planning system, etc.) of the service entity computing system and one or more transportation entities (e.g., aerial vehicle, air traffic controllers, ground vehicle, pilots, passengers, etc.) associated with a transportation service.

The one or more functional calls can be defined to be accessed by the service entity (e.g., vehicles and/or other transportation entities of the service entity), one or more third-party vehicle providers (e.g., vehicles and/or other transportation entities of the third-party service providers, etc.), etc. In this manner, the API platform can facilitate access to back-end services (e.g., provided by backend systems of the service entity (e.g., service entity computing system)) to aerial vehicles associated with one or more different vehicle providers. By way of example, the API platform can provide access to services provided by the service entity computing system such as world state services, forecasting services, optimization/planning services, and/or any other service provided by the service entity computing system.

The service entity computing system can be configured to pool a plurality of aerial vehicles from the service entity and one or more third-party aerial vehicle providers to facilitate a number of aerial transportation services during an operational time period. To do so, the service entity computing system can obtain multi-modal transportation service data associated with the service entity. The multi-modal transportation service data can include a comprehensive overview of a number, location, and timing of a plurality of anticipated aerial transportation services throughout an operation time period (e.g., one or more hours, days, months, years, etc.). As described herein, the service entity computing system can leverage this data to identify one or more third-party aerial vehicles for performing the anticipated aerial transportation services and generate targeted aerial vehicle service requests to obtain the services of the one or more third-party aerial vehicles.

More particularly, the multi-modal transportation can be indicative of one or more multi-modal transportation services associated with one or more aerial transportation legs. By way of example, each of the one or more multi-modal transportation services can include at least two transportation legs and each of the at least two transportation legs can include a respective aerial transportation leg of the one or more aerial transportation legs.

For example, the multi-modal transportation service data can include request data indicative of a plurality of requests for the one or more multi-modal transportation services. The plurality of requests can include one or more anticipated requests, one or more incoming requests, and/or one or more scheduled requests. For instance, the multi-modal transportation service data can include demand data indicative of one or more anticipated requests. For example, as discussed above, the service entity computing system can include a forecasting system that can operate a forecasting service to generate predictions of transportation demand, weather forecasts, and/or any other future looking data helpful for completing a transportation service. The forecasting system can include one or more demand models, simulation models, and/or any other models configured to generate the demand data based on one or more inputs. The demand models can include one or more machine-learned models (e.g., neural networks, convolutional networks, etc.) configured to generate one or more demand predictions for a given time period. In some implementations, the one or more machine-learning models can be learned (e.g., via one or more supervised training techniques) over a set a training data such as, for example, historical multi-modal transportation service data gathered over one or more previous operational time periods.

The multi-modal transportation service data can include information for facilitating each of the requests of the request data. For instance, the multi-modal transportation service data can include a number of anticipated services for fulfilling each of the requests of the request data. In addition, the multi-modal transportation service data can include contextual information for the number of anticipated services such as, for example, the types of services (e.g., time sensitive, capacity sensitive, etc.), aerial transport facilities associated with the services (e.g., number of services between each of a number aerial transport facilities, etc.), and/or any other contextual information.

By way of example, the multi-modal transportation service data can include itinerary data. The itinerary data can include one or more multi-modal transportation itineraries for the one or more requests and/or anticipated aerial transportation services. For example, the itinerary data can be indicative of a plurality of multi-modal transportation itineraries for facilitating the one or more multi-modal transportation services for the plurality of requests. The plurality of multi-modal transportation itineraries can include one or more scheduled itineraries (e.g., previously determine multi-modal transportation itineraries, aerial transportation legs, etc.), one or more anticipated itineraries (e.g., predicted itineraries based on anticipated requests), and/or one or more simulated transportation itineraries (e.g., candidate itineraries simulated by a simulation system).

The itinerary data can include one or more itinerary attributes associated with the plurality of multi-modal transportation itineraries. The one or more itinerary attributes can include one or more timing constraints (e.g., number of services during a time period), one or more location constraints (e.g., number services from and/or to one or more different aerial transport facilities), one or more capacity constraints (e.g., number of passengers to be transported), and/or one or more payload constraints (e.g., a weight to be transported). In some implementations, the constraints can be associated with one another. As an example, the one or more itinerary attributes can include time constraints indicative of a number of anticipated aerial transportation services over a period of time based on the plurality of multi-modal transportation itineraries, one or more location constraints indicative of a number of anticipated aerial transportation services at and/or between one or more respective aerial transport facilities based on the plurality of multi-modal transportation itineraries, and one or more time-location constraints indicative of a number of anticipated aerial transportation services at and/or between the one or more respective aerial transport facilities over the period of time based on the plurality of multi-modal transportation itineraries.

The service entity computing system can utilize vehicle(s) from one or more third-party aerial vehicle providers to perform one or more of the aerial transportation services of the multi-modal transportation service data. At times, the number of aerial vehicles available from the one or more third-party aerial vehicle providers can be shared among a plurality of different service providers. The service entity computing system can incentivize the one or more third-party aerial vehicle providers to provide vehicle(s) to the service entity by generating targeted aerial vehicle service requests.

To do so, the service entity computing system can obtain one or more aerial vehicle attributes associated with one or more aerial vehicles. The one or more aerial vehicles can be associated with an aerial vehicle provider. The aerial vehicle provider can be one of a plurality of aerial vehicle providers associated with the service entity. Each aerial vehicle provider can be associated with a fleet of aerial vehicles. A fleet can include one or a plurality of aerial vehicles of one or a plurality of different types. Each different type of aerial vehicle can be associated with one or more different aerial vehicle attributes. For example, aerial vehicles of a certain vehicle type can be associated with a one or more common aerial vehicle attributes. By way of example, a vehicle type can include a large vehicle type with a high payload capacity at the expense of speed, a small vehicle type with a low payload capacity and high speed, a luxury vehicle, etc.

The aerial vehicle attributes can include at least one of a payload capacity (e.g., maximum allowable payload, weight, etc.), a seating capacity (e.g., a maximum number of passengers per flight), a performance history (e.g., historic performance on trips for the service entity or other service providers), one or more vehicle control parameters (e.g., operational capabilities such as turning radius, lift, thrust, or drag capabilities), one or more speed parameters (e.g., maximum, minimum, or average speed, etc.), one or more maintenance requirements (e.g., infrastructure required to perform maintenance, refueling, etc. for the aerial vehicle, etc.) and/or one or more energy or range parameters (e.g., battery parameters, maximum distance before refueling, etc.).

For example, in some implementations, the aerial vehicles can include one or more electric vehicles such as, for example, electric vertical and take-off and landing vehicles. The electric vehicles can be powered by one or more batteries. In such a case, the energy or range parameters can be based, at least in part, on a battery model for a battery of the electric vehicle. The battery model can identify one or more charging parameters (e.g., types of charges, infrastructure necessary to service the battery, etc.) and a range model configured to determine a range for a respective battery.

In some implementations, each vehicle provider can be associated with one or more vehicle provider attributes. The vehicle provider attributes can include one or more fleet attributes and/or historical attributes. The one or more fleet attributes can identify one or more types of aerial vehicles within the fleet, overhead costs (e.g., fixed costs, etc.) for maintaining the fleet of aerial vehicles, opportunity costs afforded by the fleet of vehicles, etc. The one or more historical attributes can identify one or more preferences of a vehicle provider. The preferences, for example, can be determined based on a historical acceptance rate of a plurality of historical aerial vehicle service requests.

The service entity computing system can determine predicted aerial vehicle performance data for one or more aerial vehicles of an aerial vehicle provider based on the one or more vehicle attributes of the one or more aerial vehicles. The predicted aerial vehicle performance data can be associated with the one or more aerial transportation legs of the one or more (e.g., anticipated, real-time, etc.) multi-modal transportation services. For example, the predicted aerial vehicle performance data can identify one or more aerial transportation services and one or more transportation parameters associated with the one or more aerial transportation services. The one or more aerial transportation services can include, for example, a subset of the aerial transportation services of the one or more multi-modal transportation services for which the service entity computing system has determined that the one or more aerial vehicles can perform.

For example, the predicted performance data can include a predicted number, type, etc. of the transportation services that can be completed by the aerial vehicle(s) and/or one or more transportation parameters of those services. The one or more transportation parameters associated with the one or more aerial transportation services can include one or more parameters of one or more different transportation parameter types. The one or more different parameter types can include usage parameter types (e.g., one or more usage parameters), routing parameter types (e.g., one or more routing parameters), service parameter types (e.g., one or more service parameters), and/or any other type of parameter associated with the predicted transportation services for the one or more vehicles.

Usage parameters, for example, can be indicative of a flight time and/or downtime for the aerial transportation services. The estimated flight time, for example, can include an estimated time to complete the aerial transportation services of the one or more multi-modal transportation services for which the service entity computing system has determined that the one or more aerial vehicles can perform. In some implementations, an aerial vehicle service request can include a request for one or more vehicle services over an operational time period. In such a case, the usage data can include an estimated flight time (e.g., time during which the one or more vehicles are engaged in the transportation services) and/or an estimated downtime (e.g., time during which the one or more vehicles are not engaged in the transportation services) during the operational time period. In addition, the usage parameters can be indicated of an expected payload estimation, number of expected aerial transportation services, number of passenger requests serviced, etc.

Routing parameters can be indicative one or more anticipated routes for the aerial transportation services. The one or more routes can include predetermined (e.g., scheduled) routes and/or anticipated routes for the aerial transportation services. The routing parameters can include location data associated with the one or more routes such as, for example, one or more expected aerial transport facilities associated with the one or more aerial transportation services, an expected starting location for each of the one or more aerial vehicles, an expected ending location for each of the one or more aerial vehicles, etc. By way of example, the routing parameters can include one or more anticipated vehicle locations and/or one or more anticipated times associated with the one or more anticipated locations.

Service parameters can be indicative one or more margins for the aerial transportation services. The one or more margins, for example, can include one or more costs associated with the transportation services and/or an expected revenue for performing the aerial transportation services. By way of example, the one or more costs can include at least one of one or more maintenance costs, fueling costs (e.g., refueling, recharging, etc.) such as an estimated energy usage, operational costs (pilot cost, etc.), environmental costs (e.g., increase in noise by performing the services, etc.), etc. The costs can be determined based, at least in part, on whether a pilot is required for providing the aerial transportation services. The expected revenue can be indicative of an anticipated compensation parameter (e.g., compensation per service, total compensation, etc.).

The predicted aerial vehicle performance data can be based, at least in part, on a comparison between the one or more vehicle attributes and the one or more itinerary attributes. For example, the predicted aerial vehicle performance data can be based, at least in part, on a comparison between one or more itinerary attributes such as the predicted aerial transportation legs, the locations of the aerial transportation legs, the timing of the aerial transportation legs, etc. and vehicle attributes such as, for example, a location of an aerial vehicle (e.g., a current location, a home base, etc.), operational attributes of an aerial vehicle (e.g., speed capabilities, turning radius, maximum payload, maximum capacity, expected maintenance time, charging time, etc.), etc. As an example, the predicted aerial vehicle performance data can include a larger number aerial transportation services for aerial vehicles located in a high density area (e.g., an area associated with a large number of aerial transportation legs as identified by the itinerary data.

In some implementations, the service entity computing system can develop and maintain a vehicle model for each respective vehicle (and/or aerial vehicle provider) based on the vehicle attributes and/or vehicle provider attributes of the vehicle provider associated with the vehicle. The vehicle models can include one or more predictive models for the vehicle based on the attributes and/or historical usage data for the vehicle or vehicle provider (e.g., data gathered during the performance of previous aerial transportation services). The predictive vehicle models, for example, can include one or more machine-learned models trained via one or more machine learning techniques. The vehicle models (and/or one or more parameters thereof) can be updated and/or revised over time based on additional historical data. As an example, the vehicle models can include machine-learned model(s) (e.g., neural networks, convolutional networks, etc.) trained, via one or more supervised training techniques, over labeled historical usage data associated with the vehicle and/or vehicle provider. The service entity computing system can determine the predicted aerial vehicle performance data based at least in part on the vehicle models associated with each of the one or more aerial vehicles and the multi-modal transportation service data (e.g., itinerary attributes, etc.).

The service entity computing system can generate an aerial vehicle service request for the aerial vehicle provider based, at least in part, on the predicted aerial vehicle performance data. The aerial vehicle service request can be generated to obtain commitments from the one or more aerial vehicle providers to provide one or more expected aerial transportation services for the service entity. For instance, the aerial vehicle service request can include a request for one or more of the aerial vehicles associated with the aerial vehicle provider to provide an aerial transportation service for at least one of the one or more aerial transportation legs indicated by the multi-modal transportation service data. The aerial vehicle service request can include one or more service entity features and/or one or more vehicle provider features. Each feature can be indicative of a responsibility for the service entity or the aerial vehicle provider. For example, the one or more vehicle provider features can be indicative of a period of operational time and/or a number of aerial transportation services and the service entity features can include a compensation and/or an expected compensation for the period of operational time or number of aerial transportation services.

As an example, the aerial vehicle request can include service entity features indicative of one or more service entity commitments for the service entity. The service entity commitments can include one or more compensation commitments (e.g., indicative of a compensation for the vehicle provider commitments, etc.). The compensation commitment can include a value (e.g., flat rate, percentage of profits, hourly rate, etc.) for compensating the aerial vehicle provider for the vehicle provider commitments. In addition, or alternatively, the service entity commitments can include one or more infrastructure and/or maintenance commitments indicative of the service entity's responsibility to provide a maintenance (e.g., a pace of charging, etc.) and/or infrastructure (e.g., climate control devices, charging equipment, etc.) of a certain type. In some implementations, the service entity commitments can include one or more return commitments. The return commitment(s) can include responsibilities of the service entity for the return of the one or more aerial vehicles. For instance, the return commitments can include a return location (e.g., a home location of the aerial vehicle(s)), a vehicle health (e.g., charge level, climate control status, etc.), and/or a return time.

The aerial vehicle provider features can be indicative of one or more vehicle provider commitments. The one or more vehicle provider commitments can include a vehicle allocation commitment indicative of a number and/or type of aerial vehicles, an operational time commitment indicative of a period of time during which the service entity is granted access to the vehicle(s) (e.g., the vehicle(s) are put online with the service entity, etc.), and/or a number of aerial transportation services. For example, in some implementations, the vehicle provider commitments can include a commitment from the aerial vehicle provider to allocate one or more vehicles to the service entity for an operational time period to perform one or more aerial transportation services for the service entity. In some implementations, the aerial vehicle provider can maintain control of the one or more aerial vehicles but adhere to a schedule provided by the service entity.

In addition, or alternatively, the one or more vehicle provider commitments can include one or more arrival commitments, maintenance commitments, and/or any other commitment associated with an aerial transportation service. The arrival commitments can include one or more responsibilities on the delivery of the one or more aerial vehicles such as, for example, a vehicle health (e.g., structural health, safety standard, climate control level, charge level, etc.), delivery location (e.g., a specific aerial transport facility), and/or a delivery time. The maintenance commitments can include a responsibility for charging and/or cooling (e.g., to provide for aerial vehicle climate control, etc.) of the one or more aerial vehicles during the course of the one or more aerial transportation services and/or a responsibility for any other maintenance required during the course of the one or more aerial transportation services.

The service entity computing system can generate the aerial vehicle service request (e.g., one or more features thereof) targeted to the aerial vehicle provider by determining the one or more service entity features and/or the one or more vehicle provider features based, at least in part, on the aerial vehicle provider. For example, each feature of the aerial vehicle service request can be determined based on one or more vehicle provider attributes and/or historical data associated with the aerial vehicle provider. The historical data, for example, can include data indicative of one or more previous aerial vehicle service requests accepted and/or rejected by the aerial vehicle provider. The service entity computing system can monitor the one or more previous aerial vehicle service requests to learn aerial vehicle provider preferences over time.

In this manner, each aspect of the aerial vehicle service request can be customized based on the aerial vehicle provider. As an example, an aerial vehicle service request can include service entity commitments to slow charge an aerial vehicle of an aerial vehicle provider that prefers a long term battery productivity (e.g., productivity of batteries can be prolonged by slow charging methods) over additional compensation from performing additional aerial transportation services. As another example, an aerial vehicle service request can include service entity arrival and delivery commitments that schedule transportation services such that aerial vehicle(s) of an aerial vehicle provider begin the transportation services at a home location (e.g., headquarters, service depot, etc.) of the aerial vehicle provider.

In some implementations, the aerial vehicle service request can include data indicative of at least a first performance portion of the predicted aerial vehicle performance data. A performance portion of the predicted aerial vehicle performance data can be indicative of a first subset of one or more transportation parameter types associated with the one or more transportation parameters of the one or more aerial transportation services. For example, the data indicative of at least a first performance portion of the predicted aerial vehicle performance data can include in one or more parameters of a usage type, routing type, service type, etc.

The service entity computing system can generate an aerial vehicle service request targeted to an aerial vehicle provider by determining the first performance portion of the predicted aerial vehicle performance data based on the aerial vehicle provider. For example, first performance portion can be determined based on the one or more vehicle provider attributes and/or historical data associated with the aerial vehicle provider. For instance, the service entity computing system can customized the first performance portion to the preferences of the aerial vehicle provider. This can include, for example, determining a first performance portion including usage type parameters for aerial vehicle providers concerned with increased flight time (e.g., to provide pilot experience, gather aerial vehicle data, etc.). As another example, the first performance portion can include routing type parameters for aerial vehicle providers concerned with returning their aircraft to a central location, while service type parameters can be included where the aerial vehicle provider is budget conscious.

For example, the service entity computing system can generate a separate aerial vehicle service request for one or more of a plurality of aerial vehicle providers associated with the service entity. Each aerial vehicle service request can be tailored to the specific aerial vehicle provider. For instance, the service entity computing system can generate an aerial vehicle service request for a first aerial vehicle provider based, at least in part, on the first performance portion of the predicted aerial vehicle performance data. In addition, the service entity computing system can generate a second aerial vehicle service request for a second aerial vehicle provider of the plurality of aerial vehicle providers based, at least in part, on second predicted aerial vehicle performance data associated with the second aerial vehicle provider and the multi-modal transportation service data. The second aerial vehicle service request can include data indicative of at least a second performance portion. The second performance portion can be indicative of a second subset of one or more different transportation parameter types than the first performance portion. For instance, the first performance portion of the first aerial vehicle service request and the second performance portion of the second aerial vehicle service request can be independently determined based, at least in part, on historical data associated with the first and second aerial vehicle providers, respectively.

In this manner, the predicted performance information provided by an aerial vehicle service request can be specifically tailored to a respective aerial vehicle provider. By learning vehicle provider preferences over time, the service entity computing system can customize the aerial vehicle service request to increase the likelihood of acceptance and lower wasted computing resources on generating requests with a high likelihood of denial.

The service entity computing system can output data indicative of the aerial vehicle service request for the aerial vehicle provider. For instance, the service entity computing system can output the data to a computing device associated with the aerial vehicle provider. The computing device, for example, can include at least one of a pilot device associated with the at least one of the one or more aerial vehicles, a vehicle device associated with that at least one of the one or more aerial vehicles, and/or a vehicle provider device associated with the aerial vehicle provider.

In some implementations, the aerial vehicle provider (e.g., a vehicle provider computing system of the aerial vehicle provider) can obtain a plurality of aerial transportation service requests from one or more different service entities. For example, a vehicle provider computing system and/or a device thereof (e.g., a pilot device, vehicle device, vehicle provider device, etc.) can obtain data indicative of a first candidate aerial transportation service for one or more aerial vehicles of the aerial vehicle provider. The first candidate aerial transportation service, for example, can be associated with a first service entity. For example, the first candidate aerial transport can include the data indicative of the aerial vehicle service request described above. The first candidate aerial transportation service can be associated with the provision of one or more multi-modal transportation services of the first service entity.

By way of example, the data indicative of the first candidate aerial transportation service can include an aerial vehicle service request. The aerial vehicle service request can be based, at least in part, on a predicted performance of the one or more aerial vehicles in association with the provision of the one or more multi-modal transportation services of the first service entity. The data indicative of the first candidate aerial transportation service can include data associated with the predicted performance (e.g., predicted performance data) of the one or more aerial vehicles. The predicted performance can include one or more anticipated routes, an anticipated compensation parameter, an estimated energy usage, a payload estimation, a maintenance estimation, one or more anticipated vehicle locations, one or more anticipated times associated with the one or more anticipated locations, and/or any data discussed herein with reference to the predicted performance data. In some implementations, the data indicative of the first candidate aerial transportation service can include a first request for a first vehicle type associated with a first compensation parameter and/or one or more second requests for a second vehicle type associated with a second compensation parameter.

In addition, the aerial vehicle provider can obtain data indicative of at least a second candidate aerial transportation service for the one or more aerial vehicles of the aerial vehicle provider. The second candidate aerial transportation service can be associated with a second service entity. The second service entity can be different service entity from the first service entity. The second service entity, for example, can include the aerial vehicle provider, one or more other third-party service providers, etc. For instance, the second service entity can include the aerial vehicle provider and the second candidate aerial transportation service can include an internal transportation schedule for one or more aerial vehicles of the aerial vehicle provider. As another example, the second service entity can include one or more other third-party service providers such as another service entity configured to manage, coordinate, and/or dynamically adjust aerial transportation services via another transportation platform.

The aerial computing system of the aerial vehicle provider can determine a selected aerial transportation service for the one or more aerial vehicles of the aerial vehicle provider based, at least in part, on the first candidate aerial transportation service and the second candidate aerial transportation service. For example, the selected aerial transportation service can include a portion of the first candidate transportation service and/or the second candidate transportation service.

By way of example, the aerial computing system can determine the selected aerial transportation service by accepting at least a portion of the first candidate aerial transportation service associated with the first service entity and rejecting at least a portion of the second candidate aerial transportation service associated with the second service entity. In addition, or alternatively, the aerial computing system can reject at least a portion of the first candidate aerial transportation service associated with the first service entity and accept at least a portion of the second candidate aerial transportation service associated with the second service entity. As another example, the aerial computing system can accept at least a portion of the first candidate aerial transportation service associated with the first service entity and accept at least a portion of the second candidate aerial transportation service associated with the second service entity. In this manner, the aerial computing system can mix and match one or more portions of each of a plurality of candidate transportation service to obtain an optimal selected aerial transportation service.

The aerial computing system can communicate data indicative of the selected aerial transportation service to another computing system. The computing system can depend on the selected aerial transportation service. For example, the aerial computing system can communicate data indicative of the selected aerial transportation service to a computing system associated with the first service entity in the event that the selected aerial transportation service includes at least a portion of the first candidate aerial transportation service associated with the first service entity. In addition, or alternatively, the aerial computing system can communicate data indicative of the selected aerial transportation service to a computing system associated with the second service entity in the event that the selected aerial transportation service includes at least a portion of the second candidate aerial transportation service associated with the second service entity.

The aerial computing system can facilitate communication between the one or more aerial vehicles and a remote computing system for the one or more aerial vehicles to perform the selected aerial transportation service. For example, the selected aerial transport can include at least a portion of the first candidate aerial transportation service associated with the first service entity. In such a case, the aerial vehicle provider computing system can access an application programming interface associated with the first service entity. Using the application programming interface, the aerial vehicle provider computing system can generate a message indicating that the one or more aerial vehicles are or will be online with the first service entity. The aerial vehicle provider computing system can communicate the message indicating that the one or more aerial vehicles are or will be online with the first service entity based, at least in part, on the application programming interface. The first service entity computing system associated with the first entity can communicate, via the application programming interface, with the one or more aerial vehicles while the one or more aerial vehicles are online with the first service entity. In this manner, the aerial vehicle provider computing system can facilitate communication between the one or more aerial vehicles and the other computing system for the one or more aerial vehicles to perform the selected aerial transportation service.

For example, the aerial vehicle provider computing system can obtain one or more instructions for performing the portion of the first candidate aerial transportation service. The portion of the first candidate aerial transportation service can include one or more aerial transportation legs of the one or more multi-modal transportation services. For example, the first candidate aerial transportation service (e.g., the aerial vehicle service request described herein) can include one or more instructions for performing an aerial transportation leg of a respective multi-modal transportation service of one or more multi-modal transportation services (e.g., of the multi-modal transportation service data). The vehicle provider computing system can initiate the provision of the one or more aerial transportation legs of the one or more multi-modal transportation services of the first service entity based, at least in part, on the one or more instructions for performing the portion of the first candidate aerial transportation service.

In some implementations, the vehicle provider computing system can obtain updated predicted performance data during the provision of the one or more aerial transportation legs of the one or more multi-modal transportation services of the first service entity. By way of example, the service entity computing system can obtain tracking data for the at least one of the one or more aerial transportation legs. The tracking data can be indicative of a progress of the at least one of the one or more aerial transportation legs. The tracking data, for example, can include real-time data (e.g., obtained via one or more sensors, input to one or more devices (e.g., pilot device, aerial facility device, user device, etc.) associated with a multi-modal transportation service, etc.) indicative of the real-time performance of the at least one of the one or more aerial transportation legs.

The service entity computing system can determine updated predicted aerial vehicle performance data associated with the one or more aerial transportation legs based, at least in part, on the tracking data. By way of example, the service entity computing system can modify an expected flight time based on one or more flight delays, increase a compensation parameter based on an increased number of unanticipated transportation service requests, decrease a number of anticipated aerial transportation services based on inclement weather, etc. The service entity computing system can update the first portion of the predicted aerial vehicle performance data of the aerial vehicle service request based on the tracking data and output data indicative of the updated aerial vehicle service request to one or more computing devices associated with the aerial vehicle service request.

In this manner, the vehicle provider computing system and/or one or more devices thereof can obtain updated predicted performance data. The updated predicted performance data can include update routes, updated compensations parameters, updated energy usages, updated payload estimates, updated maintenance estimates, or one or more updated vehicle locations and/or one or more updated times associated with the one or more updated vehicle locations. The vehicle provider computing system can determine a continuity decision based, at least in part, on the updated predicted performance data. The continuity decision can be indicative of a decision to continue the provision of the one or more aerial transportation legs of the one or more multi-modal transportation services of the first service entity or discontinue the provision of the one or more aerial transportation legs of the one or more multi-modal transportation services of the first service entity. The vehicle provider computing system can communicate data indicative of the continuity decision to a computing system associated with the first service entity.

In some implementations, the vehicle provider computing system can reject and/or discontinue at least a portion of the first candidate aerial transportation service associated with the first service entity. In response, the first service entity can obtain feedback information (e.g., indicative of the rejection and/or one or more reasons for the rejection) associated with the rejection. For example, the first service entity can request the feedback information in response to the rejection. The vehicle provider computing system can provide the feedback data to a first service entity computing system associated with the first service entity. The feedback data can be indicative of one or more reasons for rejecting the first candidate aerial transportation service, one or more aspects (e.g., service entity features, service provider features, performance portion, etc.) of the aerial vehicle service request associated with the first candidate aerial transportation service, an accepted portion of the second candidate aerial transportation service associated with the second service entity, etc.

The service entity computing system can receive the feedback data and store the data (e.g., as historical data) associated with the aerial vehicle provider. As described above, such data can be utilized to determine one or more vehicle preferences associated with the aerial vehicle provider. The one or more vehicle preferences can be utilized to generate targeted, vehicle provider specific, aerial transportation service requests. In addition, or alternatively, the service entity computing system can utilize the feedback data and/or one or more vehicle preferences to update the aerial vehicle service request associated with the first candidate aerial transportation service and provide the updated aerial vehicle service request associated with the first candidate aerial transportation service to the aerial vehicle provider.

Example aspects of the present disclosure can provide a number of improvements to computing technology such as, for example, multi-modal transportation technology. For instance, the systems and methods of the present disclosure provide an improved approach for pooling a plurality of third-party aerial vehicles for providing on-demand aerial services. In particular, the systems and methods of the present disclosure can optimize aerial vehicle service requests by tailoring the requests to specific third-party vehicle providers. These improvements can be realized by utilizing data specific to a number of different vehicle types and providers to predict performance metrics for each different vehicle or provider. By predicting the performance metrics as disclosed herein, the systems and methods of the present disclosure can generate highly accurate aerial vehicle service requests tailored to a specific vehicle/provider and the predicted demands over an operational time period. In this manner, the systems and methods of the present disclosure can enable vehicle service providers to make informed decisions on whether to accept or reject a vehicle service requests from multiple service providers. This, in turn, allows the systems and methods disclosed herein to generate and provide vehicle service requests with a high likelihood of acceptance, thereby reducing the computing resources expended generating, providing, and analyzing low likelihood requests.

For example, a computing system can obtain multi-modal transportation service data indicative of a number of aerial transportation services. The computing system can obtain aerial vehicle attribute(s) associated with one or more aerial vehicles of an aerial vehicle provider. The computing system can determine predicted aerial vehicle performance data based on the multi-modal transportation service data and the vehicle attribute(s) and generate an aerial vehicle service request for the aerial vehicle provider based on the predicted aerial vehicle performance data. The vehicle provider can receive a plurality of aerial vehicle service requests from a number of different service entities and accept one or more portions of one or more of the requests. The computing system employs improved targeted aerial vehicle service requests with a high likelihood of relevance and acceptance to pool a plurality of third-party vehicles for servicing expected transportation services over a time period. To do so, the computing system accumulates and distributes newly available information such as, for example, the multi-modal transportation service data, vehicle attributes, and predicted aerial vehicle performance data. By leveraging the multi-modal transportation service data, the vehicle attributes, and the predicted aerial vehicle performance data the computing system can reduce the number of aerial vehicle service requests generated, and thus reduce processing resources devoted to the generation and provision of aerial vehicle service requests.

With reference now to FIGS. 1-10, example embodiments of the present disclosure will be discussed in further detail. FIG. 1 depicts a block diagram of an example system 100 according to example embodiments of the present disclosure. The system 100 can include a service entity computing system 102 that can operate to control, route, monitor, and/or communicate with aircraft (e.g., VTOL aircraft) and/or one or more other transportation service entities (e.g., third-party vehicle providers) to facilitate a multi-modal transportation service. These operations can be performed as part of a multi-modal transportation service for passengers, for example, including travel by ground vehicle and travel by aircraft (e.g., VTOL aircraft).

The service entity computing system 102 can be communicatively connected over a network 180 to one or more vehicle provider systems 140, one or more operator computing devices 150 for a first transportation modality, one or more operator computing devices 160 for a second transportation modality, one or more operator computing devices 170 for an Nth transportation modality, and/or one or more infrastructure and operations computing devices 190.

Each of the computing systems/devices 140, 150, 160, 170, 190 can include any type of computing device such as a smartphone, tablet, hand-held computing device, wearable computing device, embedded computing device, navigational computing device, vehicle computing device, laptop, desktop, server system, etc. A computing device can be associated with a computing system. A computing device can include one or more processors and a memory (e.g., similar to as will be discussed with reference to processors 112 and memory 114). Although operator devices are shown for N different transportation modalities, any number of different transportation modalities can be used, including, for example, less than the three illustrated modalities (e.g., two modalities can be used).

The service entity computing system 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the service entity computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

In some implementations, the service entity computing system 102 can facilitate the ability of a user to receive transportation on one or more of the transportation legs included in an itinerary. As one example, the service entity computing system 102 can implement and/or interact with one or more ride-sharing networks (e.g., vehicle provider computing system(s) 140) to match the user with one or more transportation operators 150, 160, 170. As another example, the service entity computing system 102 can book or otherwise reserve a seat in, space on, or usage of one or more of the transportation modalities for the user. Additionally, or alternatively, the service entity computing system 102 can simply provide information for options to be provided by one or more third parties for one or more of the transportation legs.

More particularly, the service entity computing system 102 can be associated with a service entity and be configured to manage, coordinate, and dynamically adjust a multi-modal transportation service via a transportation platform of the service entity. The service entity can include, for example, a transportation network provider. The transportation network provider can be an entity that coordinates, manages, etc. transportation services that include aerial and/or other types of vehicles. The transportation network provider can be associated with one or more transportation platforms. A transportation platform can be utilized for the provision of transportation services via one or more vehicles available, online, etc. to the transportation platform. In some implementations, the vehicles used to provide the transportation services can be owned, operated, leased, etc. by the service entity (e.g., the transportation network provider). Additionally, or alternatively, the vehicles used to provide the transportation service can be owned, operated, leased, etc. by an entity other than the service entity (e.g., a third party vehicle provider).

In some implementations, the service entity computing system 102 can respond to a user's request for a transportation service by determining whether it is better to fulfill the user's request using a single transportation modality or using multiple transportation modalities. As one example, the service entity computing system 102 can evaluate the user's current location, request origin, and/or destination to determine which modalities of transportation are usable at such location (e.g., able to access such locations). For example, the location(s) can be checked against a list of white listed locations that have been approved for participation in various types of modalities (e.g., flight modalities for the purpose of generating a multi-modal trip itinerary). As another example, the service entity computing system 102 can evaluate (e.g., generate) one or more itineraries that are single-modal and one or more itineraries that a multi-modal (e.g., inclusive of various combinations of different transportation modalities). The service entity computing system 102 can compare the generated single- and multi-modal itineraries to determine whether it is appropriate to suggest a single- or multi-modal itinerary to the user. For example, one or more of the best itineraries (e.g., as evaluated based on various characteristics such as cost, time, etc.) can be suggested to the user. The user can select one of the suggested itineraries to receive transportation services in accordance with the selected itinerary.

In addition, in some implementations, the service entity computing system 102 can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the service entity computing system 102 can suggest the improved itinerary for selection by the user. In some implementations, if the user selects the improved itinerary during completion of an existing itinerary, the service entity computing system 102 can facilitate switching to the updated itinerary, including, for example, re-routing a transportation provider that is currently transporting the user to an alternative, updated destination.

In some implementations, the service entity computing system 102 can include and implement logic for handling transportation operator cancellations and/or inappropriate usage (e.g., "gaming") of the ride sharing network by the transportation operator. As one example, in the event of an operator cancellation or if the operator is not making substantial progress toward fulfilling the requested transportation service, the service entity computing system 102 can automatically prompt a re-handling of the rider's request (e.g., re-match to a different operator but using the same itinerary). Alternatively, or additionally, the service entity computing system 102 can automatically create a new request and perform the itinerary creation process an additional time (e.g., in the case that leg(s) of the original itinerary are accepted by a matched operator but not fulfilled).

In addition, or alternatively, to operator cancellations, the service entity computing system 102 can include and implement logic for handling user cancellations. As one example, if the user cancels the transportation request/itinerary prior to the scheduled time of pickup and/or actual pickup for the initial transportation leg, the service entity computing system 102 can cancel the entire trip/itinerary. As another example, if a transportation operator has already been matched for the initial leg, a first cancellation by the user can be treated as a request to re-match the user for the initial transportation leg. A second cancellation by the user can then result in the entire trip/itinerary being cancelled. This logic which interprets the first cancellation as a re-match request avoids cancelling the entire trip when the user is simply cancelling the match with the first operator because the first operator is not making substantial progress toward completing the transportation service (e.g., operator's vehicle is not moving toward the pickup location).

According to another aspect of the present disclosure, in some implementations and scenarios, the service entity computing system 102 can disable the ability of a transportation operator to contact the user. In particular, one possible scenario is that the user is currently being transported via flight-based transportation. During flight, the user may have been matched with a ground-based transportation provider. The ground-based transportation provider may arrive at the transfer point (e.g., a destination transportation node) in advance of the user's flight and begin contacting the user (e.g., via phone call or text message) asking the user of their location and if the user is ready to engage in the ground-based transportation service. This can be a frustrating or otherwise undesirable experience for the user as the user may feel as though they are delaying the ground-based transportation operator and/or being rushed by the ground-based transportation operator but, because they are currently on the flight, the user is unable to take action to reduce the time until the ground-based service can be engaged. Thus, to prevent this scenario, the service entity computing system 102 may disable a ground-based operator's ability to contact the user if the ground-based service is being provided following a flight-based transportation leg and the flight-based transportation leg has not yet completed. Once the flight-based transportation leg has completed, the operator may be re-enabled to contact the user. In some implementations, the service entity computing system 102 can provide the user with status updates to keep the user informed despite disabling the operator's ability to contact the user (e.g., "John has arrived and is ready to take you to your destination"). In some implementations, the service entity computing system 102 can provide the operator with status updates to keep the operator informed despite disabling the operator's ability to contact the user (e.g., "Jane's flight is delayed by 5 minutes" or "Jane's flight will arrive in 7 minutes").

In some implementations, the service entity computing system 102 can perform one or more mitigation processes or routines to mitigate failure of one or legs of transportation in a multi-leg transportation itinerary. As one example, a mitigation service implemented by the service entity computing system 102 can include and implement logic for responding to cancellations of flights on which a user is booked. As one example, if a planned flight is cancelled and the user has not yet initiated the itinerary or a threshold period before initiation of the itinerary has not yet been reached, then the service entity computing system 102 can cancel the entire trip/itinerary. The user can be notified of the cancellation and given an opportunity to re-submit the request for transportation. However, if the user has already initiated the itinerary or a threshold period before initiation of the itinerary has been entered, the service entity computing system 102 can notify the user and offer to re-route (e.g., re-plan the trip with updated information, re-match for the transportation leg with an alternative operator, and/or change that transportation leg to an alternative transportation modality). In some implementations, the re-routing operations can be given preference or preferential treatment (e.g., the user's use of a luxury modality may be subsidized or reduced-fare).

In some implementations, when a multi-modal itinerary has been completed, the service entity computing system 102 can provide the user with a single receipt. The single receipt can detail respective portions of the final cost associated with each of the multiple legs of transportation. The service entity computing system 102 can generate the single receipt by generating multiple receipts respectively for the multiple transportation legs and then stitching the multiple receipts to generate the single receipt.

More particularly, a service entity computing system 102 can receive a request from a user to facilitate a transportation service for the user from an origin to a destination. For example, the user can interact with a dedicated application on the user's computing device (e.g., smartphone, tablet, wearable computing device, or the like) to initiate the request. In response to the request, the service entity computing system 102 can generate at least one itinerary that includes transportation of the user from the origin to the destination. Specifically, the service entity computing system 102 can create an end-to-end multi-modal itinerary that includes two or more transportation legs that include travel via two or more different transportation modalities such as, for example: cars, light electric vehicles (e.g., electric bicycles or scooters), buses, trains, aircraft, watercraft, and/or other transportation modalities. Example aircrafts can include helicopters and other vertical take-off and landing aircraft (VTOL) such as electric vertical take-off and landing aircraft (eVTOL).

The vehicles can include non-autonomous, semi-autonomous, and/or fully-autonomous vehicles provided and/or maintained by one or more vehicle providers (e.g., vehicle providers associated with vehicle provider computing device(s) 140). For instance, each vehicle can include a service entity vehicle provided and/or maintained by a service entity vehicle provider associated with the service entity computing system 102 and/or a third-party vehicle provided and/or maintained by a third-party vehicle provider (e.g., a vehicle provider computing system 140). As described herein, the service entity computing system 102 can provide cross-platform support to third-party vehicle providers. For instance, the service entity computing system 102 can provide access to one or more services of the service entity computing system 102 to systems (e.g., vehicle provider computing systems 140, etc.) associated with third-party vehicle providers.

For example, the service entity computing system 102 can include a number of different systems such as a world state system 126, a forecasting system 128, an optimization/planning system 130, a matching and fulfillment system 132, and/or an aerial vehicle allocation system 138. The matching and fulfillment system 132 can include a different matching system 134 for each transportation modality and a monitoring and mitigation system 136. Each of the systems 126-138 can be implemented in software, firmware, and/or hardware, including, for example, as software which, when executed by the processors 112 to cause the service entity computing system 102 to perform desired operations. The desired operations, for example, can provide one or more backend services of the service entity computing system 102 to one or more associated devices 140, 150, 160, 170, 190. For example, the world state system 126 can provide a backend world state service. The forecasting system 128 can provide a backend forecasting service. The optimization/planning system can provide a backend routing service. The matching and fulfillment system 132 can provide a matching and monitoring service. And, the aerial vehicle allocation system 138 can provide a backend allocation system. The systems 126-138 can cooperatively interoperate (e.g., including supplying information to each other).

In response to a user's request, the service entity computing system 102 (e.g., optimization/planning system 130) can perform one or more algorithms to generate an itinerary for the user. As an example, the service entity computing system 102 can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first).

As one particular example, in some implementations, the service entity computing system 102 can initially analyze a first transportation modality that is the most efficient (e.g., in terms of travel speed and/or cost) transportation modality which operates according to a fixed infrastructure. As an example, for most longer transportation services and for the mix of different modalities described above, flight modalities will often both be the most efficient transportation modality (e.g., in terms travel speed/time) while also operating according to a fixed infrastructure. By first analyzing the most efficient transportation modality which operates according to a fixed infrastructure, the service entity computing system 102 can seek to identify an important transportation leg around which the remainder of the itinerary can be stitched.

More particularly, in some implementations, one or more of the transportation modalities can operate according to or within a fixed transportation infrastructure in which the ability of passengers to embark and disembark vehicles is constrained to a defined set of transportation nodes. For instance, the fixed transportation infrastructure can include a plurality of aerial vehicles (e.g., service entity aircraft, third-party aircraft, etc.) that operate within a ride sharing network facilitated by the service entity computing system 102. The aerial vehicle(s) can be constrained to load and unload passengers only at a defined set of physical take-off and/or landing areas which may in some instances be referred to as aerial transport facilities.

Figure 2:
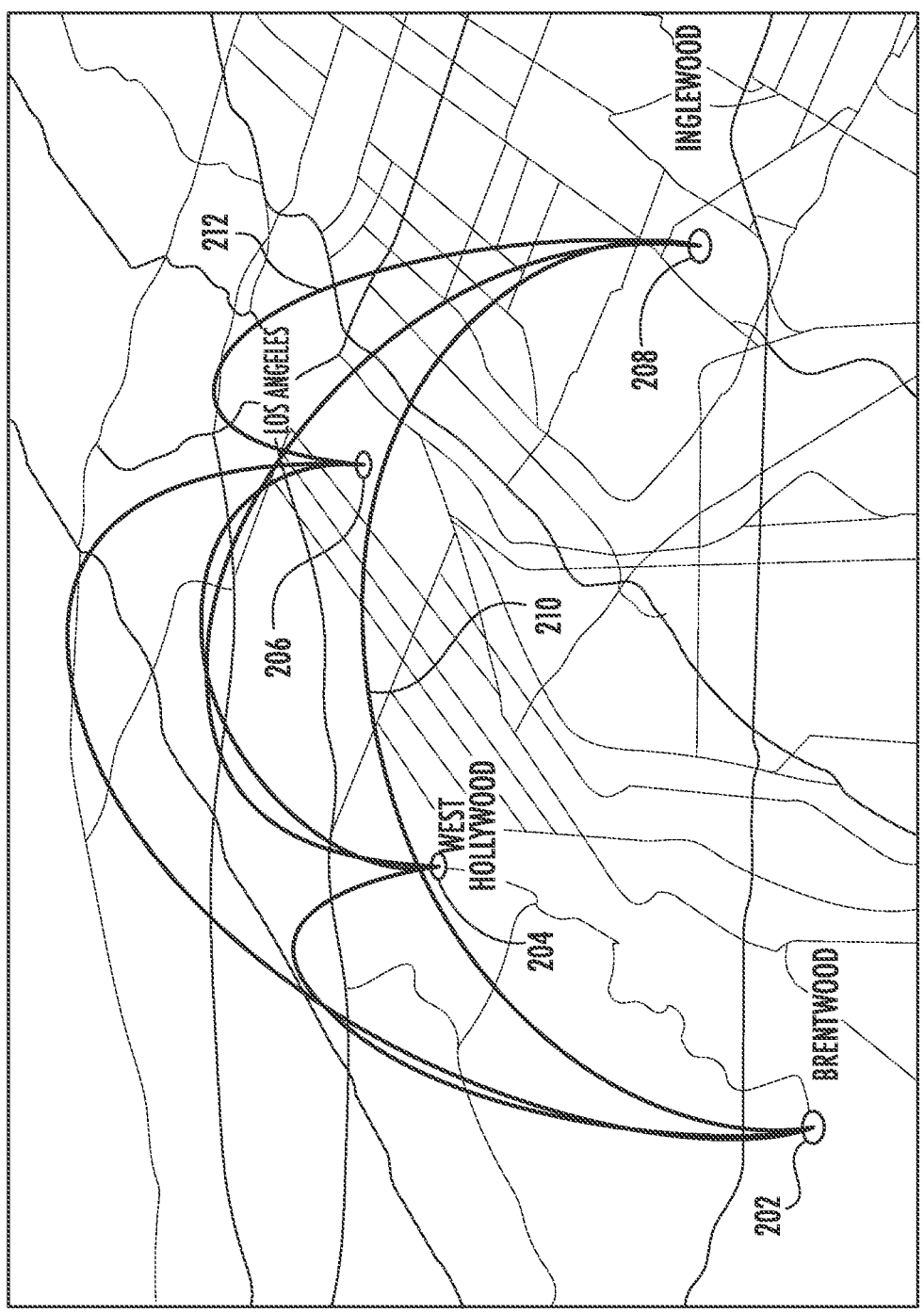
FIG. 2 depicts a graphical diagram of an example set of flight plans between an example set of transportation nodes according to example embodiments of the present disclosure.

By way of example, FIG. 2 depicts a graphical diagram of an example set of flight plans between an example set of aerial transport facilities according to example embodiments of the present disclosure. In particular, FIG. 2 provides a simplified illustration of an example fixed infrastructure associated with flight-based transportation in an example metropolitan area. As illustrated in FIG. 2, there are four aerial transport facilities which may be referred to as "skyports." For example, a first aerial transport facility 202 is located in a first neighborhood of the metropolitan area, a second aerial transport facility 204 is located in a second neighborhood, a third aerial transport facility 206 is located in a third neighborhood, and a fourth aerial transport facility 208 is located in a fourth neighborhood. The location and number of aerial transport facility is provided only as an example. Any number of transportation nodes at any different locations can be used.

Flights are available (e.g., may be pre-planned, determined on demand, etc.) between certain pairs of the aerial transport facility. For example, a flight path 210 exists between the first aerial transport facility 202 and the fourth aerial transport facility 208. Likewise, a flight path 212 exists between the fourth aerial transport facility 208 and the third aerial transport facility 206.

Figure 3:
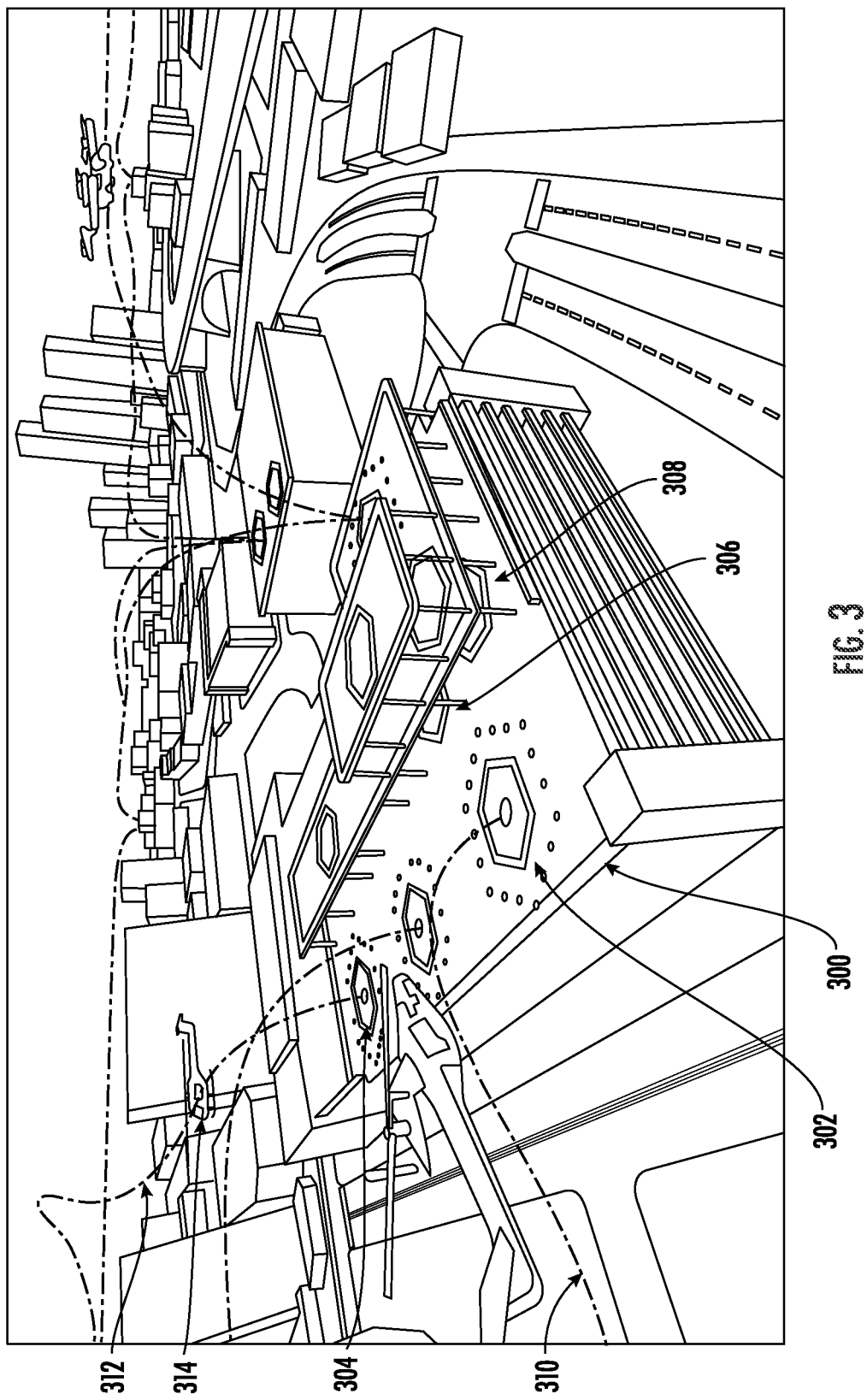
FIG. 3 depicts a graphical diagram of an example transportation node according to example embodiments of the present disclosure.

FIG. 3 depicts a graphical diagram of an example aerial transport facility 300 according to example embodiments of the present disclosure. The example aerial transport facility 300 includes a number of take-off/landing pads such as pads 302 and 304. The example aerial transport facility 300 also includes a number of vehicle parking locations such as parking locations 306 and 308. For example, re-fueling or re-charging infrastructure may be accessible at each parking location.

Flight trajectories into and out of the aerial transport facility 300 may be defined, configured, assigned, communicated, etc. FIG. 3 illustrates a number of flight trajectories including, for example, trajectories 310 and 312. The trajectories can be fixed or can be dynamically computed. The trajectories can be computed by the aircraft or can be centrally computed and then assigned and communicated to the aircraft. As one example, FIG. 3 illustrates a helicopter 314 taking off from the pad 304 according to the trajectory 312.

Turning back to FIG. 1, the use of fixed infrastructure can constrain the number and availability of operators and/or vehicle providers. As such, in some instances, the service entity computing system 102 can initially identify any aerial transport facilities associated with a first transportation modality (e.g., flight modality) that are relevant to the user's request. For example, the service entity computing system 102 can identify any aerial transport facilities that are within a threshold distance from the origin location as candidate departure facilities. Likewise, the service entity computing system 102 can identify any aerial transport facilities that are within a threshold distance from the destination location as candidate arrival facilities.

The service entity computing system 102 (e.g., an optimization/planning system 130) can pre-determine a number of planned transportation services by the operators. For example, in some implementations, aerial vehicles of a ride-sharing network (e.g., service entity vehicles, third-party vehicles, etc.) can be scheduled and/or otherwise controlled by the service entity computing system 102 in accordance with the ride sharing network. For instance, the service entity computing system 102 can generate (e.g., on a daily basis) an initial pre-defined set of flight plans for the aerial vehicles of the ride-sharing network and can add and/or remove passengers from each planned flight. In some implementations, the service entity computing system 102 can dynamically optimize (e.g., via an optimization and planning system 130) planned transportation services by the operators to account for real-time changes in rider availability and demand. For example, the service entity computing system 102 can dynamically modify the pre-determined flight plans (e.g., delay a planned flight departure by five minutes and/or change a planned flight to an alternative arrival transportation node).

In scenarios in which the first transportation modality operates according to pre-determined plans, after identifying the relevant aerial transport facilities, the service entity computing system 102 can access a database of pre-determined transportation plans to identify candidate transportation plans between the relevant facilities. For example, the service entity computing system 102 can identify any transportation plans between one of the candidate departure facilities and/or one of the candidate arrival facilities which would satisfy the user's request, including, for example, any departure or arrival time requests.

In some implementations, for example in which a transportation modality does not have pre-determined plans but instead operates in an "on-demand" nature, the service entity computing system 102 can match (e.g., via a matching and fulfillment system 132, etc.) the user with a vehicle provider for the transportation modality from a free-floating, dynamic pool of independent vehicle providers. For example, vehicle providers can dynamically opt in and out of the ride sharing network and the service entity computing system 102 can operate to match the passenger with a vehicle of a vehicle provider who is currently opted into the network. The vehicle provider can choose to provide the service to the passenger or decline to provide the service. For example, for flight modalities, the service entity computing system 102 can match the user to one of a dynamically changing pool of aerial vehicles and the aerial vehicles (e.g., a pilot of an aerial vehicle, a vehicle provider associated with the aerial vehicle, etc.) can choose (e.g., via one or more functional calls to the matching and fulfillment system 132) to provide or decline the proposed aerial transportation service.

The service entity computing system 102 can identify (and/or predict, generate, etc.) a set of candidate transportation plans that can form the basis for building a set of potential itineraries. The service entity computing system 102 can stitch additional transportation legs to each respective candidate transportation plan to generate a plurality of candidate end-to-end itineraries. The service entity computing system 102 can analyze the candidate itineraries to select one or more itineraries that are high quality according to various measures. The service entity computing system 102 can interact with one or more vehicles (e.g., aerial vehicles, ground vehicles, etc.) and/or one or more operators (e.g., pilots, drivers, etc.) or vehicle providers of the one or more vehicles to enable the user to complete at least one of the one or more itineraries. The vehicle providers, for example, can include a service entity vehicle provider associated with the service entity computing system 102 and/or one or more third-party vehicle providers associated with vehicle provider computing system(s) 140. In some implementations, the one or more operators can include a human operator (e.g., driver or pilot) and/or a vehicle computing system configured to operate the vehicle.

Figure 4:
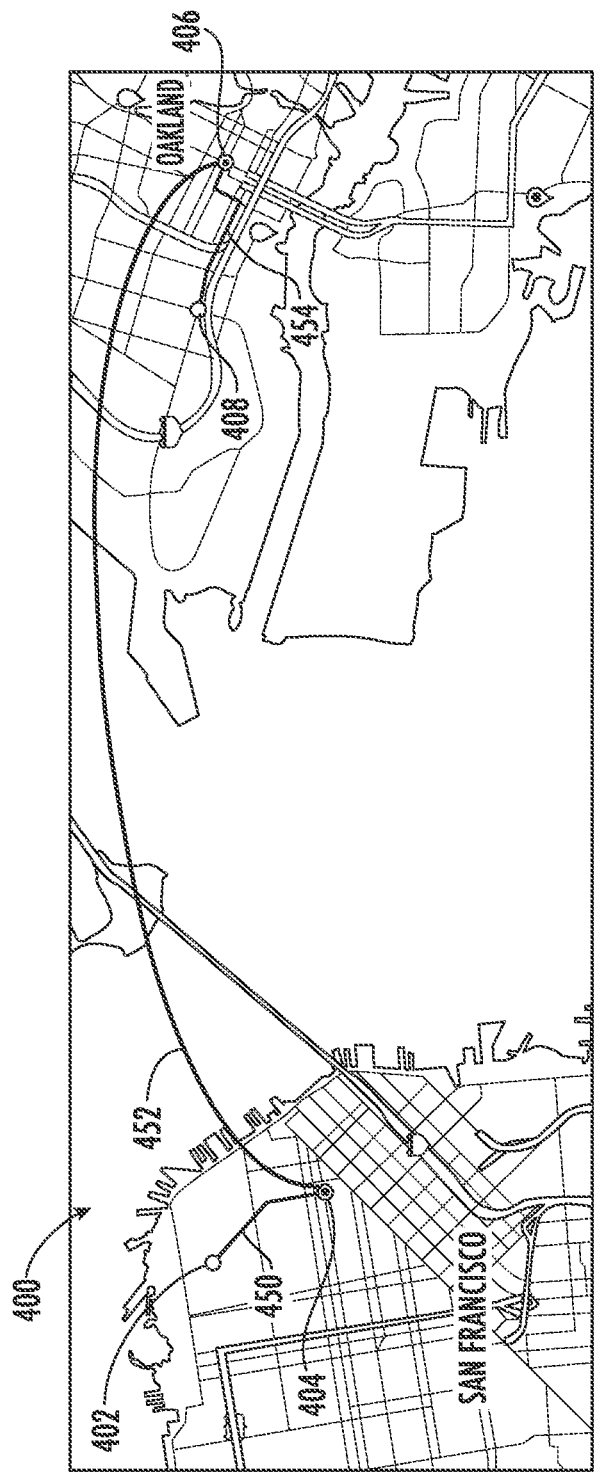
FIG. 4 depicts a graphical diagram of an example multi-modal transportation service itinerary according to example embodiments of the present disclosure.

With reference to FIG. 4, FIG. 4 depicts a graphical diagram of an example multi-modal transportation service itinerary 400 according to example embodiments of the present disclosure. The itinerary 400 includes three transportation legs to transport the user from an origin 402 to a destination 408. In particular, the itinerary 400 includes a first, ground-based (e.g., car-based) transportation leg 450 which transports the user from the origin 402 to a departure transportation node 404; a second, flight-based transportation leg 452 which transports the user from the departure transportation node 404 to an arrival transportation node 406; and a third, ground-based (e.g., car-based) transportation leg 454 which transports the user from the arrival transportation node 406 to the destination 408.

Turning back to FIG. 1, the service entity computing system 102 can include a number of subsystems configured to provide a plurality of backend services to facilitate a transportation service. By way of example, the optimization/planning system 130 can provide a backend an itinerary service to generate one or more itineraries for a user in accordance with the procedures described herein. In addition, the system 130 can provide a backend routing service to determine one or more flight plans, routes, skylanes, etc. for vehicles associated with transportation service. The world state system 126 can operate a state monitoring service to maintain data descriptive of a current state of the world (e.g., a predicted transportation demand, flight assignments, operational statuses and locations of a plurality of vehicles, etc.). The forecasting system can operate a forecasting service to generate predictions of transportation demand, weather forecasts, and/or any other future looking data helpful for completing a transportation service.

More particularly, the world state system 126 can operate to maintain data descriptive of a current state of the world. For example, the world state system 126 can generate, collect, and/or maintain data descriptive of predicted rider demand; predicted vehicle provider supply; predicted weather conditions; planned itineraries; pre-determined transportation plans (e.g., flight plans) and assignments; current requests; current ground transportation vehicle providers; current aerial transport facility operational statuses (e.g., including re-charging or re-fueling capabilities); current aerial vehicle statuses (e.g., including current fuel or battery level); current pilot statuses; current flight states and trajectories; current airspace information; current weather conditions; current communication system behavior/protocols; and/or the like. The world state system 126 can obtain such world state information through communication with some or all of the devices 140, 150, 160, 170, and/or 190. For example, devices 140 can provide current information about riders, devices 150, 160, and 170 can provide current information about operators, and vehicle provider computing system(s) 140 can provide current information about vehicles and/or vehicle providers. Devices 190 can provide current information about the status of infrastructure and associated operations/management.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks. By way of example, the RMR system can have access to one or more trajectory prediction libraries that can include one or more models or algorithms configured to determine the predicted behavior of one or more entities associated with a transportation service.

The optimization/planning system 130 can generate transportation plans for various transportation assets and/or can generate itineraries for riders. For example, the optimization/planning system 130 can perform flight planning. As another example, optimization/planning system 130 can plan or manage/optimize itineraries which include interactions between riders, operators, and vehicle providers across multiple modes of transportation.

The matching and fulfillment system 132 can match a rider with an operator and vehicle (e.g., associated with the service entity or a vehicle provider) for each of the different transportation modalities. For example, each respective matching system 134 can communicate with the corresponding operator computing devices 150, 160, 170 and/or vehicle provider computing system(s) 140 via one or more APIs or connections. Each matching system 134 can communicate trajectories and/or assignments to the corresponding operators, vehicles, vehicle providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 150, 160, 170, and 190. For example, entities such as riders, vehicle providers, operators, operations personnel, etc. can be alerted when a certain transportation plan has been modified and can be provided with an updated plan/course of action. Thus, the monitoring and mitigation system 136 can have additional control over the movement of aerial vehicles, ground vehicles, air traffic controllers, pilots, and riders.

The aerial vehicle allocation system 138 can be configured to obtain access to one or more third-party aerial vehicles for performing one or more anticipated aerial transportation services. Third-party aerial vehicles can be those aerial vehicles that are not included in the fleet of, owned by, controlled by, etc. the service entity associated with the service entity computing system (e.g., the service entity coordinating the transportation services for the user, etc.). Vehicles of the service entity can be called first-party or service entity vehicles. As described in further detail herein, the aerial vehicle allocation system 138 obtain multimodal transportation services data including predictions for aerial transportation demand and aerial vehicle supply. Based on this information, the aerial vehicle allocation system 138 can communicate with one or more vehicle provider computing system(s) 140 to obtain access to one or more aerial vehicles within a fleet of independent third-party aerial vehicles maintained by a vehicle provider. In this way, the aerial vehicle allocation system 138 can pool together a plurality of third-party aerial vehicles for the provision of a plurality of predicted aerial transportation services.

For example, the system 100 can include one or more vehicle provider computing systems 140. The vehicle provider computing system(s) 140 can be associated with one or more vehicle providers. A vehicle provider can be an entity (e.g., a first party entity, third party entity, etc.) that operates, owns, leases, controls, manufactures, etc. one or more vehicles. For example, a vehicle provider can include an operator, vendor, supplier, manufacturer, etc. of one or more aircraft. Each vehicle provider can be associated with respective vehicle provider computing system(s) 140. The vehicle provider computing system(s) 140 can be configured to manage the vehicles associated with that vehicle provider. This can include, for example, overseeing itineraries, accepting/rejecting transportation services, suggesting candidate vehicles, overseeing maintenance, controlling online/offline status, etc. A vehicle provider computing device 140 can communicate with the service entity computing system 102 directly and/or indirectly. A vehicle associated with a vehicle provider can communicate directly with the service entity computing system 102 and/or indirectly via the vehicle provider computing system(s) 140 (e.g., acting as an intermediary, etc.).

Figure 5:
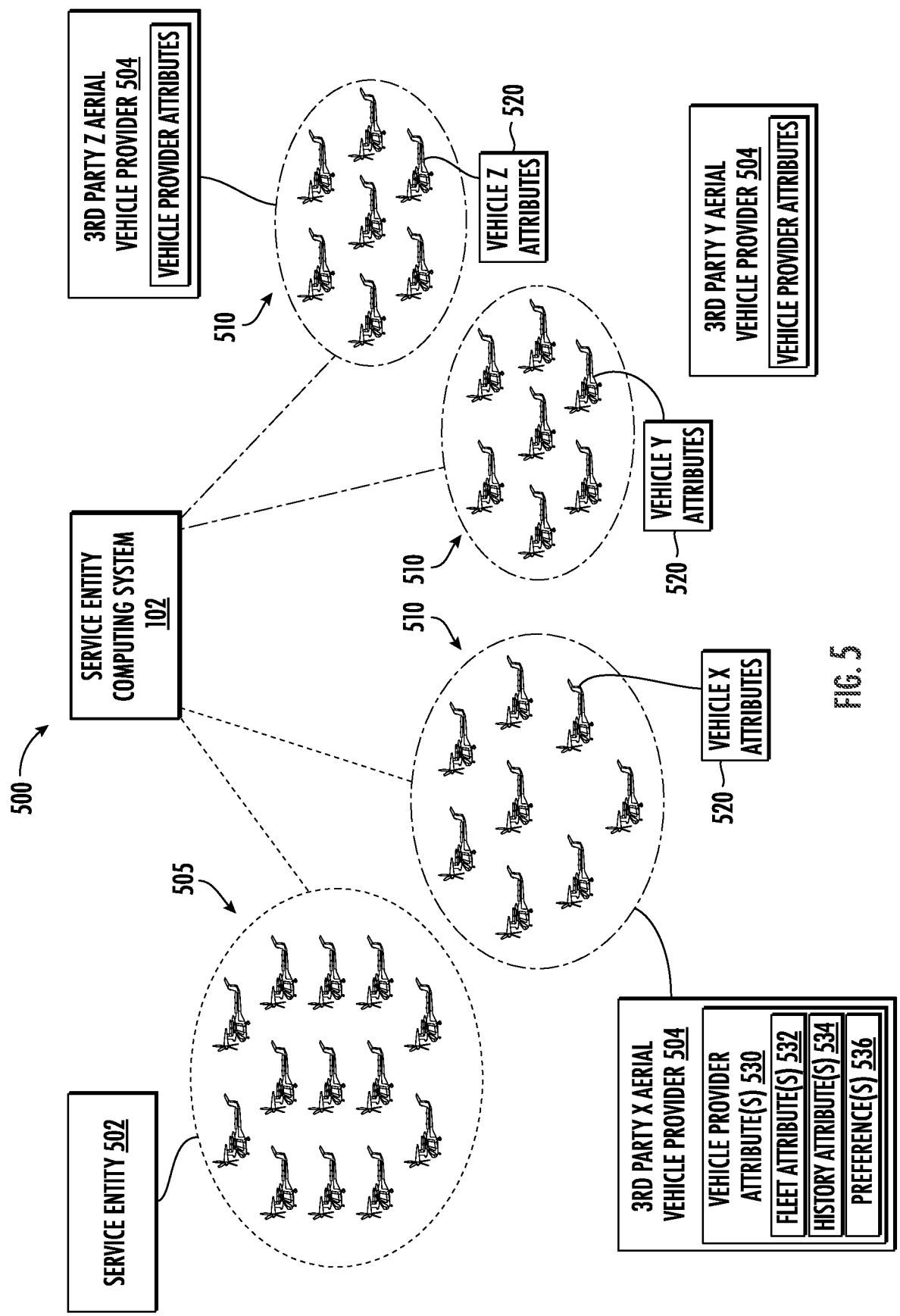
FIG. 5 depicts example types of vehicle providers according to example embodiments of the present disclosure.

By way of example, FIG. 5 depicts example ecosystem 500 of vehicle providers according to example embodiments of the present disclosure. The service entity computing system 102 can utilize service entity vehicle(s) 505 of the service entity 502 and/or one or more vehicle(s) 510 from one or more third-party aerial vehicle provider(s) 504 to perform one or more of aerial transportation services (e.g., throughout an operational time period such as an hour, day, week, etc.). The number of aerial vehicles available from the one or more third-party aerial vehicle providers 504 can be independently available to a plurality of different ride-sharing entities.

For example, each third party aerial vehicle provider 504 can include a respective fleet 510 of one or more aerial vehicle(s). The aerial vehicle(s) can include one or more autonomous, semi-autonomous, and/or manual aerial vehicles. The vehicle(s) can include any type of aircraft such as, for example, helicopters and/or other vertical take-off and landing aircraft (VTOL) including electric vertical take-off and landing aircraft (eVTOL). For instance, the vehicles can include one or more electric vehicles such as, for example, electric vertical and take-off and landing vehicles. The electric vehicles can be powered by one or more electric batteries.

The service entity 102 associated with the service entity computing system 102 can utilize vehicles 510 associated with various third parties. In some implementations, the service entity 102 can also be a vehicle provider (e.g., a first party entity, etc.). For example, the service entity 102 can utilize vehicles (e.g., ground-based vehicles, aircraft, etc.) within the service entity's fleet 505 that are online with the transportation platform, etc. Additionally, or alternatively, the service entity 502 can utilize vehicles provided by a vehicle provider 504 from the vehicle provider's fleet 510. A fleet 510 can include one or a plurality of vehicles. A vehicle provider 504 can make one or more of the vehicles in its fleet 510 available to the service entity/service entity computing system 102. For example, the vehicle provider computing system(s) 140 and/or a service provider computing device of a vehicle can log into a transportation platform, provide data indicating a vehicle is available, facilitate the vehicle being actively engaged with the transportation platform, and/or otherwise inform a service entity 502 of a vehicle's availability. In some implementations, a vehicle provider computing device 140 can provide data indicative of vehicles that are not online with the service entity 502 and that could or may become available.

The vehicles that are available for transportation services can include one or more types of vehicles. For example, the vehicle provider(s) 504 can include a plurality of aerial vehicle providers, where each vehicle provider can provide a different type of aircraft (e.g., VTOL, helicopter, etc.) and/or a different model of aircraft. In some implementations, a vehicle provider can provide more than one type, version, model, etc. of aircraft available for the service entity computing system 102 and/or the service entity 502. The different types of aircraft can include different shapes, sizes, capacities, capabilities, parameters, autonomy abilities (e.g., autonomous, semi-autonomous, manual, etc.), landing gear, hardware, etc. Although the following describes vehicle providers 504 as aerial vehicle providers, this is provided as an example only and is not intended to be limiting. For example, vehicle providers 504 can include providers of other types of vehicles such as ground-based vehicles (e.g., cars, bicycles, scooters, etc.) and/or other modes of transportation.

Each vehicle can be associated with one or more vehicle attributes such as, for example, aerial vehicle attributes 520. The aerial vehicle attributes 520 can be associated with one or more constraints and/or capabilities of a respective aerial vehicle. For example, the aerial vehicle attributes can include at least one of a payload capacity (e.g., maximum allowable payload, weight, etc.), a seating capacity (e.g., a maximum number of passengers per flight), a performance history (e.g., historic performance on trips for the service entity or other service providers), one or more vehicle control parameters (e.g., operational capabilities such as turning radius, lift, thrust, or drag capabilities), one or more speed parameters (e.g., maximum, minimum, or average speed, etc.), one or more maintenance requirements (e.g., infrastructure required to perform maintenance, refueling, etc. for the aerial vehicle, etc.) and/or one or more energy or range parameters (e.g., battery parameters, maximum distance before refueling, etc.). The energy or range parameters can be based, at least in part, on a battery model for a battery of an electric vehicle. The battery model can include one or more charging parameters (e.g., types of charges (e.g., slow, fast, etc.), infrastructure necessary to service the battery (standardized charging interfaces, etc.), etc.) and a range model configured to determine a range for a respective battery based on a current state of the battery (e.g., charge level, etc.) and/or any other factor that may affect the performance of the battery.

In addition, each vehicle provider 504 can be associated with one or more vehicle provider attributes 530. The vehicle provider attributes 530 can include one or more fleet attributes 532, historical attributes 534, and/or one or more preference(s) 536. The one or more fleet attributes 532 can identify one or more types of aerial vehicles and/or any other attribute associated with the one or more aerial vehicles within the fleet 510 of vehicles associated of the aerial vehicle provider 504. By way of example, each vehicle provider 504 can be associated with a fleet 510 of aerial vehicles including one or a plurality of different types of aerial vehicles. Each different type of aerial vehicle can be associated with one or more different aerial vehicle attributes. For example, aerial vehicles of a certain vehicle type can be associated with a one or more common aerial vehicle attributes. By way of example, a vehicle type can include a large vehicle type with a high payload capacity at the expense of speed, a small vehicle type with a low payload capacity and high speed, a luxury vehicle, a high speed vehicle, etc. In some implementations, the fleet attributes 532 can identify one or more overhead costs (e.g., fixed costs, etc.) for maintaining the fleet 510 of aerial vehicles and/or one or more opportunity costs afforded by the fleet 510 of aerial vehicles.

The one or more historical attributes 534 can be indicative of one or more historical interactions between the aerial vehicle provider 504 and the service entity computing system 102. For example, the historical attribute(s) 534 can be indicative of one or more previous requests for aerial transportation services received by the aerial vehicle provider 504 and/or one or more previous aerial transportation services provided by vehicles of the aerial vehicle provider 504. For instance, the historical attribute(s) 534 can be indicative of a reliability of the aerial vehicle provider 504, a willingness to accept aerial vehicle service requests, service time constraint(s) met or exceeded, etc.

The vehicle provider attributes 530 can include one or more vehicle provider preference(s) 536. The vehicle provider preference(s) 536 can be indicative of one or more aerial vehicle services and/or one or more types of aerial vehicle service requests that have a high acceptance rate from the vehicle provider 504. For example, the vehicle provider preference(s) 536 can indicate one or more portions (e.g., performance portion, type of aerial transportation services, etc.) of an aerial vehicle service request that are preferred by the aerial vehicle provider 504. This can include, for example, longer flight times, shorter flight times, types of vehicle maintenance (e.g., charging times, etc.), and/or any other aspect of an aerial transportation service request. In some implementations, the preference(s) 536 can be inferred based, at least in part, on the historical attribute(s) 534. By way of example, the preference(s) 536 can be based on a historical acceptance rate of a plurality of historical aerial vehicle service requests.

Turning back to FIG. 1, the service entity computing system 102 and the vehicle provider computing system(s) 140 can communicate information to one another. The vehicle provider computing system(s) 140 can communicate various types of information to the service entity computing system 102. For example, the vehicle provider computing system(s) 140 can provide data indicative of: status information (e.g., online/offline status, on-trip status, vehicle availability for transportation service, etc.), acceptance and/or rejection of a service (e.g., an aerial transportation service, etc.), maintenance information, vehicle parameters (e.g., weight capacity, noise signature, number of seats, set configuration, flight hours, charging/refueling parameters, hardware, temperature control parameters, operational restrictions, etc.), flight schedules, candidate vehicles, locations, updates of any such information, etc. The service entity computing system 102 can communicate various types of information to a vehicle provider system(s) 140. For example, the service entity computing system 102 can provide data indicative of: transportation services (e.g., services needed, specific vehicle requests, etc.), vehicle itineraries, status information (e.g., service in progress, etc.), vehicle parameter updates, payloads, locations, user/passenger information (e.g., anonymized and securely protected, etc.), air traffic information, environmental data (e.g., expected wind speeds, weather information, etc.), and/or other types of information.

As discussed herein, the service entity associated with the service entity computing system 102 can utilize vehicles associated with various parties. The vehicles to be utilized for a particular multi-modal transportation service can be determined in a variety of manners. The service entity computing system 102 (and the associated service entity) may have varying levels of control over the vehicle(s) that perform its services. For example, a vehicle provider may make one or more vehicles available to the service entity. The service entity may be able to determine which vehicles are to perform which legs of a transportation without input from the vehicle provider. Thus, the service entity may have full control of the vehicles online with the platform.

In some implementations, the service entity may determine transportation service assignments for vehicles of the service entity, while a vehicle provider may be able to determine (e.g., accept, reject, etc.) transportation service assignments for its vehicles. For example, the service entity computing system 102 can provide data indicative of a flight leg, itinerary, etc. to one or more vehicle provider computing devices 140. The data can indicate a request for a specific vehicle or a request for any available vehicle within the vehicle provider's available fleet to perform the transportation service (e.g., flight transportation between two vertiports, etc.). In some implementations, the data may include certain parameters (e.g., weight capacity, number of seats, noise parameters, etc.) needed and/or preferred by the service entity, user, etc. The vehicle provider computing device 140 can process this data and determine whether a specifically requested vehicle and/or another vehicle associated with the vehicle provider will provide the requested service (e.g., perform a flight for the second leg of a multi-model transportation service). The vehicle provider computing device 140 can communicate data indicative of the acceptance or rejection to the service entity computing system 102. In some implementations, data indicative of the requested transportation service can be communicated to a service provider computing device 150, 160, 160 associated with a vehicle of a vehicle provider's fleet (e.g., an aircraft, etc.) and the service provider can accept or reject the service (e.g., the flight transportation, etc.).

In some implementations, one or more vehicle provider computing system(s) 140 can communicate data indicative of a plurality of candidate vehicles that could provide the requested service (e.g., perform an aerial transportation service for a flight leg). The service entity computing system 102 can select from among the plurality of candidate vehicles and communicate data indicative of the selected candidate vehicle to the vehicle provider computing system(s) 140.

The service entity computing system 102 can determine which vehicles are to perform which transportations legs in an on-demand manner or based at least in part on a schedule. For example, service entity computing system 102 can initially generate a flight itinerary in response to receiving a first request. In some implementations, the service entity computing system 102 can have a pre-determined flight schedule and offer aerial transport (e.g., for multi-modal transportation services, etc.) in the event that a user's time constraints and locations can be met with the pre-determined flight schedule.

In some implementations, the vehicle provider may provide initial input regarding vehicle scheduling. For example, the vehicle provider computing system 140 can communicate data indicative of a flight schedule for one or more aircrafts between various vertiports. The vehicle provider system 140 can communicate initial seat availability, as well as updates throughout an operational time period (e.g., throughout a day, etc.), to the service entity computing system 102. The service entity computing system 102 can utilize this flight schedule to determine itineraries for users and/or vehicles of the transportation service. For example, the service entity computing system 102 can use the flight schedule to determine whether to offer a multi-modal transportation service with an aerial leg to a user and/or to generate itineraries with aerial legs based on the flight schedule. In some implementations, the flight schedule can be an initial flight schedule for an operational time period. For example, the vehicle provider computing system(s) 140 can provide data indicative of the initial flights for the available vehicles at the beginning of a day. The service entity computing system 102 can utilize this data to determine multi-modal transportation services at the beginning of the day. Thereafter, the service entity computing system 102 can determine the flight itineraries in an on-demand manner to meet user/passenger demand throughout the operational time period.

Additionally, or alternatively, the service entity computing system 102 can communicate data indicative of a schedule (e.g., initial, for full operational period, etc.) to the vehicle provider computing system(s) 140. The vehicle provider computing system(s) 140 can process the schedule and communicate data indicative of which vehicles (e.g., aircraft, etc.) are available for which services (e.g., flight legs, etc.).

In some implementations, the service entity computing system 102 can communicate data indicative of a transportation service (e.g., one or more flight legs, schedules, etc.) to a plurality of vehicle provider computing system(s) 140. One or more of the vehicle provider computing system(s) 140 can process the data and communicate data indicative of vehicle(s) (e.g., aircraft, etc.) that are available to fulfill the transportation service (e.g., perform aerial transportation for one or more leg(s), etc.) to the service entity computing system 102. In some implementations, the vehicle provider computing system(s) 140 can provide information indicative of vehicle parameters, costs/fees, etc. The service entity computing system 102 can be configured to analyze the responses from the plurality of vehicle provider computing systems 140 to determine a service provider. For example, the service entity computing system 102 can utilize rules, models, algorithms, etc. that weigh the various vehicle parameters to select an aircraft for a user to ensure that the user's estimated arrival times are not violated, to minimize costs, etc.

The vehicle provider computing system(s) 140 and/or the service entity computing system 102 can communicate data indicative of the transportation service (e.g., flight itinerary data, etc.) to a service provider computing device 150, 160, 170, associated with a vehicle. For example, a vehicle provider system 140 or the service entity computing system 102 can communicate data indicative of a flight (e.g., times, locations, users, payload, etc.) to a computing device onboard an aircraft and/or a device of a pilot of the aircraft.

In some implementations, the service entity computing system 102 can store or include one or more machine-learned models. The models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

The infrastructure and operations computing devices 190 can be any form of computing device used by or at the infrastructure or operations personnel including, for example, devices configured to perform passenger security checks, luggage check in/out, re-charging/re-fueling, climate control, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, encoding, format, packaging, etc.

The service entity computing system 102 can interact with various vehicle providers (e.g., via vehicle provider computing system(s) 140), operators 150, 160, 170 and/or other entities (e.g., infrastructure and operations computing device(s) 190, etc.) over the network(s) 180. To do so, the transportation service system 102 can include an application programming interface platform to facilitate services between the service entity infrastructure (e.g., the services of the service entity computing system 102, etc.) and/or the one or more operators or vehicle providers. The API platform can include one or more functional calls to the backend services (e.g., world state services, forecasting services, routing services, optimization and planning services, matching services, monitoring services, allocation services, other support services, etc.) of the service entity computing system 102. By way of example, the one or more functional calls can be configured to communicate a request and/or data between one or more subsystems (e.g., world state system 126, forecasting system 128, optimization/planning system 130, matching and fulfillment system 132, matching system 134, monitoring and mitigation system 136, aerial vehicle allocation system 138, etc.) of the service entity computing system 102 and one or more transportation entities associated with a transportation service (e.g., aerial vehicles, air traffic controllers, ground vehicles, pilots, passengers, etc.).

The one or more functional calls can be defined to be accessed by the service entity (e.g., vehicles and/or other transportation entities of the service entity), one or more third-party vehicle providers (e.g., vehicles and/or other transportation entities of the third-party vehicle providers, etc.), etc. In this manner, the API platform can facilitate access to back-end services (e.g., provided by backend systems of the service entity computing system 102) to aerial vehicles associated with one or more different vehicle providers. By way of example, the API platform can provide access to services provided by the service entity computing system 102 such as world state services, a forecasting services, an optimization/planning services, and/or any other service provided by the service entity computing system 102.

Figure 6:
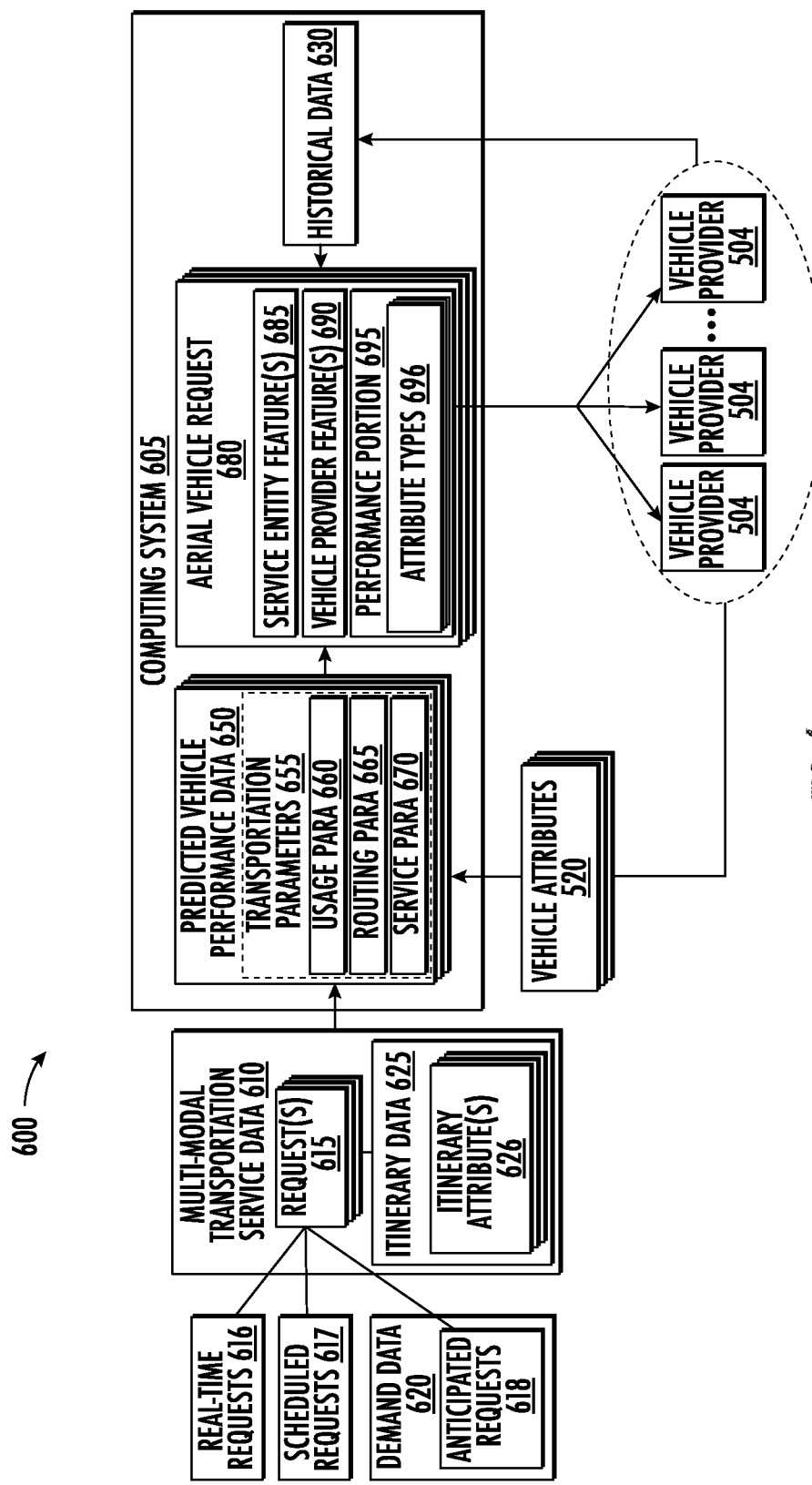
FIG. 6 depicts a dataflow diagram for generating an aerial vehicle service request according to example embodiments of the present disclosure.

FIG. 6 depicts a dataflow diagram 600 for generating an aerial vehicle service request according to example embodiments of the present disclosure. FIG. 6 depicts a computing system 605 (e.g., service entity computing system 102, etc.) configured to obtain multi-modal transportation service data 610, aerial vehicle attributes 520, and historical data 630. The computing system 605 can determine predicted vehicle performance data 650; generate an aerial vehicle request 680; and provide the request 680 to one or more aerial vehicle provider(s) 504. In this way, the computing system 605 (e.g., via the aerial vehicle allocation system 138) can be configured to pool a plurality of aerial vehicles from the service entity and one or more aerial vehicle providers 504 to facilitate a number of aerial transportation services during an operational time period.

More particularly, the computing system 605 can obtain multi-modal transportation service data 610 associated with the service entity. The multi-modal transportation service data 610 can include a comprehensive overview of a number, location, and timing of a plurality of anticipated aerial transportation services throughout an operational time period (e.g., one or more hours, days, months, years, etc.). The computing system 605 can leverage this data to identify one or more aerial vehicles for performing the anticipated aerial transportation services and generate targeted aerial vehicle service requests to obtain the services of the one or more aerial vehicles.

The multi-modal transportation data 610 can be indicative of one or more multi-modal transportation services associated with one or more aerial transportation legs. For instance, each of the one or more multi-modal transportation services can include at least two transportation legs and each of the at least two transportation legs can include a respective aerial transportation leg of the one or more aerial transportation legs. In addition, or alternatively, in some implementations, each of the at least two transportation legs can include a ground transportation leg.

For instance, the multi-modal transportation service data 610 can include request data indicative of a plurality of requests 615 for the one or more multi-modal transportation services. The plurality of requests 615 can include one or more real-time requests 616, one or more scheduled requests 617, and/or one or more anticipated requests 618. For instance, the multi-modal transportation services data 610 can include demand data 620 indicative of one or more anticipated requests 618. For example, as discussed above herein, a computing system can include a forecasting system that can operate a forecasting service to generate predictions of transportation demand, weather forecasts, and/or any other future looking data helpful for completing a transportation service. The forecasting system can include one or more demand models, simulation models, and/or any other models configured to generate the demand data 620 based on one or more inputs. The demand models can include one or more machine-learned models (e.g., neural networks, convolutional networks, etc.) configured to generate one or more demand predictions for a given time period. In some implementations, the one or more machine-learning models can be learned (e.g., via one or more supervised training techniques) over a set a training data such as, for example, historical multi-modal transportation service data gathered over one or more previous operational time periods.

The multi-modal transportation service data 610 can include information for facilitating each of the requests 615 of the request data. For instance, the multi-modal transportation services data 610 can include a number of anticipated services for fulfilling each of the requests 615 of the request data. In addition, the multi-modal transportation services data 610 can include contextual information for the number of anticipated services such as, for example, the types of services (e.g., time sensitive, capacity sensitive, etc.), aerial transport facilities associated with the services (e.g., number of services between each of a number aerial transport facilities, etc.), and/or any other contextual information.

By way of example, the multi-modal transportation service data 610 can include itinerary data 625. The itinerary data 625 can include one or more multi-modal transportation itineraries for the plurality of requests 615 and/or anticipated aerial transportation services. For example, the itinerary data 615 can be indicative of a plurality of multi-modal transportation itineraries for facilitating the one or more multi-modal transportation services for the plurality of requests 615. The plurality of multi-modal transportation itineraries can include one or more scheduled itineraries (e.g., previously determined multi-modal transportation itineraries, aerial transportation legs, etc.), one or more anticipated itineraries (e.g., predicted itineraries based on anticipated requests 618), and/or one or more simulated transportation itineraries (e.g., candidate itineraries simulated to model the predicted itineraries over an operational time period).

The itinerary data 625 can include one or more itinerary attributes 626 associated with the plurality of multi-modal transportation itineraries. The one or more itinerary attributes 626 can include one or more timing constraints (e.g., number of services during a time period), one or more location constraints (e.g., number services from and/or to one or more different aerial transport facilities), one or more capacity constraints (e.g., number of passengers to be transported), and/or one or more payload constraints (e.g., a weight to be transported). In some implementations, the constraints can be associated with one another. As an example, the one or more itinerary attributes 626 can include time constraints indicative of a number of anticipated aerial transportation services over a period of time based on the plurality of multi-modal transportation itineraries, one or more location constraints indicative of a number of anticipated aerial transportation services at and/or between one or more respective aerial transport facilities based on the plurality of multi-modal transportation itineraries, and/or one or more time-location constraints indicative of a number of anticipated aerial transportation services at and/or between the one or more respective aerial transport facilities over the period of time based on the plurality of multi-modal transportation itineraries.

The computing system 605 can incentivize the one or more aerial vehicle providers 504 to provide vehicle(s) to the service entity by generating targeted aerial vehicle service requests 680. To do so, the computing system 605 can obtain one or more aerial vehicle attributes 520 associated with one or more aerial vehicles. The one or more aerial vehicles can be associated with a respective aerial vehicle provider of the one or more aerial vehicle provider(s) 504. For example, the aerial vehicle provider can be one of a plurality of aerial vehicle providers 504 associated with the service entity (e.g., registered with, under agreement with, online with, available to, etc. the service entity). As described herein, each aerial vehicle provider can be associated with a fleet of aerial vehicles that can include one or a plurality of aerial vehicles of one or a plurality of different types.

The computing system 605 can determine predicted aerial vehicle performance data 650 for one or more aerial vehicles of an aerial vehicle provider based on the one or more vehicle attributes 520 of the one or more aerial vehicles. The predicted aerial vehicle performance data 650 can be associated with the one or more aerial transportation legs of the one or more (e.g., anticipated, real-time, etc.) multi-modal transportation services. For example, the predicted aerial vehicle performance data 650 can identify one or more aerial transportation services and one or more transportation parameters 655 associated with the one or more aerial transportation services. The one or more aerial transportation services can include, for example, at least a subset of the aerial transportation services of the one or more multi-modal transportation services for which the computing system 605 has determined that the one or more aerial vehicles can perform.

For example, the predicted vehicle performance data 650 can include a predicted number, type, etc. of the aerial transportation services that can be completed by the aerial vehicle(s) and/or one or more transportation parameters 655 associated with those services. The one or more transportation parameters 655 associated with the one or more aerial transportation services can include one or more different transportation parameter types. The one or more different transportation parameter types can include usage parameter types (e.g., one or more usage parameters 660), routing parameter types (e.g., one or more routing parameters 665), service parameter types (e.g., one or more service parameters 670), and/or any other type of parameter associated with the predicted transportation services for the one or more vehicles.

Usage parameters 660, for example, can be indicative of a flight time and/or downtime for the aerial transportation services. The estimated flight time, for example, can include an estimated time to complete the aerial transportation services of the one or more multi-modal transportation services for which the computing system 605 has determined that the one or more aerial vehicles can perform. In some implementations, an aerial vehicle service request can include a request for one or more vehicle services over an operational time period. In such a case, the usage parameters 660 can include an estimated flight time (e.g., time during which the one or more vehicles are engaged in the transportation services) and/or an estimated downtime (e.g., time during which the one or more vehicles are not engaged in the transportation services) during the operational time period. In addition, the usage parameters 660 can be indicative of an expected payload estimation, number of expected aerial transportation services, number of passenger requests serviced, etc.

Routing parameters 665 can be indicative one or more anticipated routes for the aerial transportation services. The one or more routes can include predetermined (e.g., scheduled) routes and/or anticipated routes for the aerial transportation services. The routing parameters 665 can include location data associated with the one or more routes such as, for example, one or more expected aerial transport facilities associated with the one or more aerial transportation services, an expected starting location for each of the one or more aerial vehicles, an expected ending location for each of the one or more aerial vehicles, etc. By way of example, the routing parameters 665 can include one or more anticipated vehicle locations and/or one or more anticipated times associated with the one or more anticipated locations.

Service parameters 670 can be indicative of one or more margins for the aerial transportation services. The one or more margins, for example, can include one or more costs associated with the transportation services and/or an expected revenue for performing the aerial transportation services. By way of example, the one or more costs can include at least one of one or more maintenance costs, fueling costs (e.g., refueling, recharging, etc.) such as an estimated energy usage, operational costs (pilot cost, etc.), environmental costs (e.g., increase in noise by performing the services, etc.), etc. The costs can be determined based, at least in part, on whether a pilot is required for providing the aerial transportation services. The expected revenue can be indicative of an anticipated compensation parameter (e.g., compensation per service, total compensation, etc.).

The predicted vehicle performance data 650 can be based, at least in part, on a comparison between the one or more vehicle attributes 520 and the one or more itinerary attributes 626. For example, the predicted vehicle performance data 650 can be based, at least in part, on a comparison between one or more itinerary attributes 626 such as the predicted aerial transportation legs, the locations of the aerial transportation legs, the timing of the aerial transportation legs, etc. and vehicle attributes 520 such as, for example, a location of an aerial vehicle (e.g., a current location, a home base, etc.), operational attributes of an aerial vehicle (e.g., speed capabilities, turning radius, maximum payload, maximum capacity, expected maintenance time, charging time, etc.), etc. As an example, the predicted vehicle performance data 650 can include a larger number aerial transportation services for aerial vehicles located in a high density area (e.g., an area associated with a large number of aerial transportation legs as identified by the itinerary attributes 626).

In some implementations, the computing system 605 can develop and maintain a vehicle model for each respective vehicle and/or type of vehicle (and/or aerial vehicle provider 504) based on the vehicle attributes 520 and/or vehicle provider attributes of the vehicle provider associated with the vehicle. The vehicle models can include one or more predictive models for the vehicle based on the attributes 520 and/or historical usage data for the vehicle or vehicle provider (e.g., data gathered during the performance of previous aerial transportation services). The predictive vehicle models, for example, can include one or more machine-learned models trained via one or more machine learning techniques. The vehicle models (and/or one or more parameters thereof) can be updated and/or revised over time based on additional historical data. As an example, the vehicle models can include machine-learned model(s) (e.g., neural networks, convolutional networks, etc.) trained, via one or more supervised training techniques, over labeled historical usage data associated with the vehicle and/or vehicle provider. The computing system 605 can determine the predicted vehicle performance data 650 based at least in part on the vehicle models associated with each of the one or more aerial vehicles and the multi-modal transportation service data 610 (e.g., itinerary attributes 626, etc.).

The computing system 605 can generate an aerial vehicle service request 680 for the aerial vehicle provider based, at least in part, on the predicted vehicle performance data 650. The aerial vehicle service request 680 can be generated to obtain commitments from the one or more aerial vehicle providers 504 to provide one or more expected aerial transportation services for the service entity. For instance, the aerial vehicle service request 680 can include a request for one or more of the aerial vehicles associated with the aerial vehicle provider to provide an aerial transportation service for at least one of the one or more aerial transportation legs indicated by the multi-modal transportation service data 610. The aerial vehicle service request 680 can include one or more service entity features 685 and/or one or more vehicle provider features 690. Each feature 685, 690 can be indicative of a responsibility for the service entity and/or the aerial vehicle provider. For example, the one or more vehicle provider features 690 can be indicative of a period of operational time and/or a number of aerial transportation services and the service entity features 685 can include a compensation and/or an expected compensation for the period of operational time or number of aerial transportation services.

As an example, the aerial vehicle service request 680 can include service entity features 685 indicative of one or more service entity commitments for the service entity. The service entity commitments can include one or more compensation commitments (e.g., indicative of a compensation for the vehicle provider commitments, etc.). The compensation commitments can include a value (e.g., flat rate, percentage of profits, hourly rate, etc.) for compensating the aerial vehicle provider for the vehicle provider commitments. For example, the compensation commitment can include a compensation parameter indicative of an estimated compensation based on a number of expected aerial transportation services.

In addition, or alternatively, the service entity features 685 can include one or more infrastructure and/or maintenance commitments indicative of the service entity's responsibility to provide maintenance (e.g., a pace of charging, etc.) and/or infrastructure (e.g., climate control devices, charging equipment, etc.) of a certain type. For instance, the service entity features 685 can include a commitment to recharge the one or more aerial vehicles at one or more time intervals (e.g., after the vehicle has completed the assigned transportation service, in between one or more assigned transportation services, etc.) with one or more approved charging devices (e.g., with a specific charging interface) in a specific manner (e.g., slow charging, fast charging, etc.).

In some implementations, the service entity attributes 685 can include one or more return commitments. The return commitment(s) can include responsibilities of the service entity for the return of the one or more aerial vehicles. For instance, the return commitments can include a return location (e.g., a home location of the aerial vehicle(s)), a vehicle health (e.g., charge level, climate control status, etc.), and/or a return time.

The vehicle provider features 690 can be indicative of one or more vehicle provider commitments. For instance, the one or more vehicle provider features 690 can include a vehicle allocation commitment indicative of a number and/or type of aerial vehicles, an operational time commitment indicative of a period of time during which the service entity is granted access to the vehicle(s) (e.g., the vehicle(s) are put online with the service entity, etc.), and/or a number of aerial transportation services. For example, in some implementations, the vehicle provider commitments 690 can include a commitment from the aerial vehicle provider to allocate one or more vehicles to the service entity for an operational time period to perform one or more aerial transportation services for the service entity. In some implementations, the aerial vehicle provider can maintain control of the one or more aerial vehicles but adhere to a schedule provided by the service entity.

In addition, or alternatively, the one or more vehicle provider attributes 690 can include one or more arrival commitments, maintenance commitments, and/or any other commitment associated with an aerial transportation service. The arrival commitments can include one or more responsibilities on the delivery of the one or more aerial vehicles such as, for example, a vehicle health (e.g., structural health, safety standard, climate control level, charge level, etc.), delivery location (e.g., a specific aerial transport facility), and/or a delivery time. The maintenance commitments can include a responsibility for charging and/or cooling (e.g., to provide for aerial vehicle climate control, etc.) of the one or more aerial vehicles during the course of the one or more aerial transportation services and/or a responsibility for any other maintenance required during the course of the one or more aerial transportation services.

The computing system 605 can generate the aerial vehicle service request 680 (e.g., one or more features thereof) targeted to the aerial vehicle provider by determining the one or more service entity features 685 and/or the one or more vehicle provider features 690 based, at least in part, on the aerial vehicle provider. For example, each feature of the aerial vehicle service request 680 can be determined based on one or more vehicle provider attributes and/or historical data 630 associated with the aerial vehicle provider. The historical data 630, for example, can include data indicative of one or more previous aerial vehicle service requests accepted and/or rejected by the aerial vehicle provider. The computing system 605 can monitor the one or more previous aerial vehicle service requests to learn aerial vehicle provider preferences over time.

In this manner, each aspect of the aerial vehicle service request 680 can be customized based on the aerial vehicle provider. As an example, an aerial vehicle service request 680 can include service entity commitments to slow charge an aerial vehicle of an aerial vehicle provider that prefers a long term battery productivity (e.g., productivity of batteries can be prolonged by slow charging methods) over additional compensation from performing additional aerial transportation services. As another example, an aerial vehicle service request 680 can include service entity arrival and delivery commitments that schedule transportation services such that aerial vehicle(s) of an aerial vehicle provider begin the transportation services at a home location (e.g., headquarters, service depot, etc.) of the aerial vehicle provider.

In some implementations, the aerial vehicle service request 680 can include data indicative of at least a first performance portion 695 of the predicted vehicle performance data 650. A performance portion 695 of the predicted vehicle performance data 650 can be indicative of a first subset of one or more transportation parameter types 696 associated with the one or more transportation parameters 655 of the one or more aerial transportation services. For example, the data indicative of at least a first performance portion 695 of the predicted vehicle performance data 650 can include one or more parameters of a usage type, routing type, service type, etc.

The computing system 605 can generate an aerial vehicle service request 680 targeted to an aerial vehicle provider by determining the first performance portion 695 of the predicted vehicle performance data 650 based on the aerial vehicle provider. For example, first performance portion 695 can be determined based on the one or more vehicle provider attributes and/or historical data 630 associated with the aerial vehicle provider. For instance, the computing system 605 can customize the first performance portion 695 to the preferences of the aerial vehicle provider. This can include, for example, determining a first performance portion 695 including usage type parameters for aerial vehicle providers concerned with increased flight time (e.g., to provide pilot experience, gather aerial vehicle data, etc.). As another example, the first performance portion can include routing type parameters for aerial vehicle providers concerned with returning their aircraft to a central location, while service type parameters can be included where the aerial vehicle provider is budget conscious.

For example, the computing system 605 can generate a separate aerial vehicle service request for one or more of the plurality of aerial vehicle providers 504 associated with the service entity. Each aerial vehicle service request can be tailored to the specific aerial vehicle provider (and/or the vehicles in its fleet). For instance, the computing system 605 can generate an aerial vehicle service request for a first aerial vehicle provider based, at least in part, on the first performance portion of the predicted vehicle performance data. As an example, the first aerial vehicle provider can be associated with a preference toward usage information. Thus, the first performance portion can include attribute types of a usage type (e.g., usage parameters).

In addition, the computing system 605 can generate a second aerial vehicle service request for a second aerial vehicle provider of the plurality of aerial vehicle providers 504 based, at least in part, on second predicted vehicle performance data associated with the second aerial vehicle provider and the multi-modal transportation service data 610. The second aerial vehicle service request can include data indicative of at least a second performance portion. The second performance portion can be indicative of a second subset of one or more different transportation parameter types than the first performance portion. As an example, the second aerial vehicle provider can be associated with a preference against usage information and for routing information. Thus, the second performance portion can include attribute types of a routing type (e.g., routing parameters).

The performance portion is not limited to one parameter type and can include one or more types of parameters. For instance, in some implementations, the computing system 605 can include each parameter of the predicted vehicle performance data 650 in an aerial vehicle request 680.

In this manner, the first performance portion of the first aerial vehicle service request and the second performance portion of the second aerial vehicle service request can be independently determined based, at least in part, on historical data associated with the first and second aerial vehicle providers, respectively. Thus, the predicted performance information provided by an aerial vehicle service request can be specifically tailored to a respective aerial vehicle provider. By learning vehicle provider preferences over time, the computing system 605 can customize the aerial vehicle service request(s) 680 to increase the likelihood of acceptance and lower wasted computing resources on generating requests with a high likelihood of denial.

The computing system 605 can output data indicative of the aerial vehicle service request 680 for the aerial vehicle provider. For instance, the computing system 605 can output the data to a computing device (e.g., vehicle provider computing system(s) 140) associated with the aerial vehicle provider. The computing device, for example, can include at least one of a pilot device associated with the at least one of the one or more aerial vehicles, a vehicle device associated with that at least one of the one or more aerial vehicles, and/or a vehicle provider device associated with the aerial vehicle provider.

Figure 7:
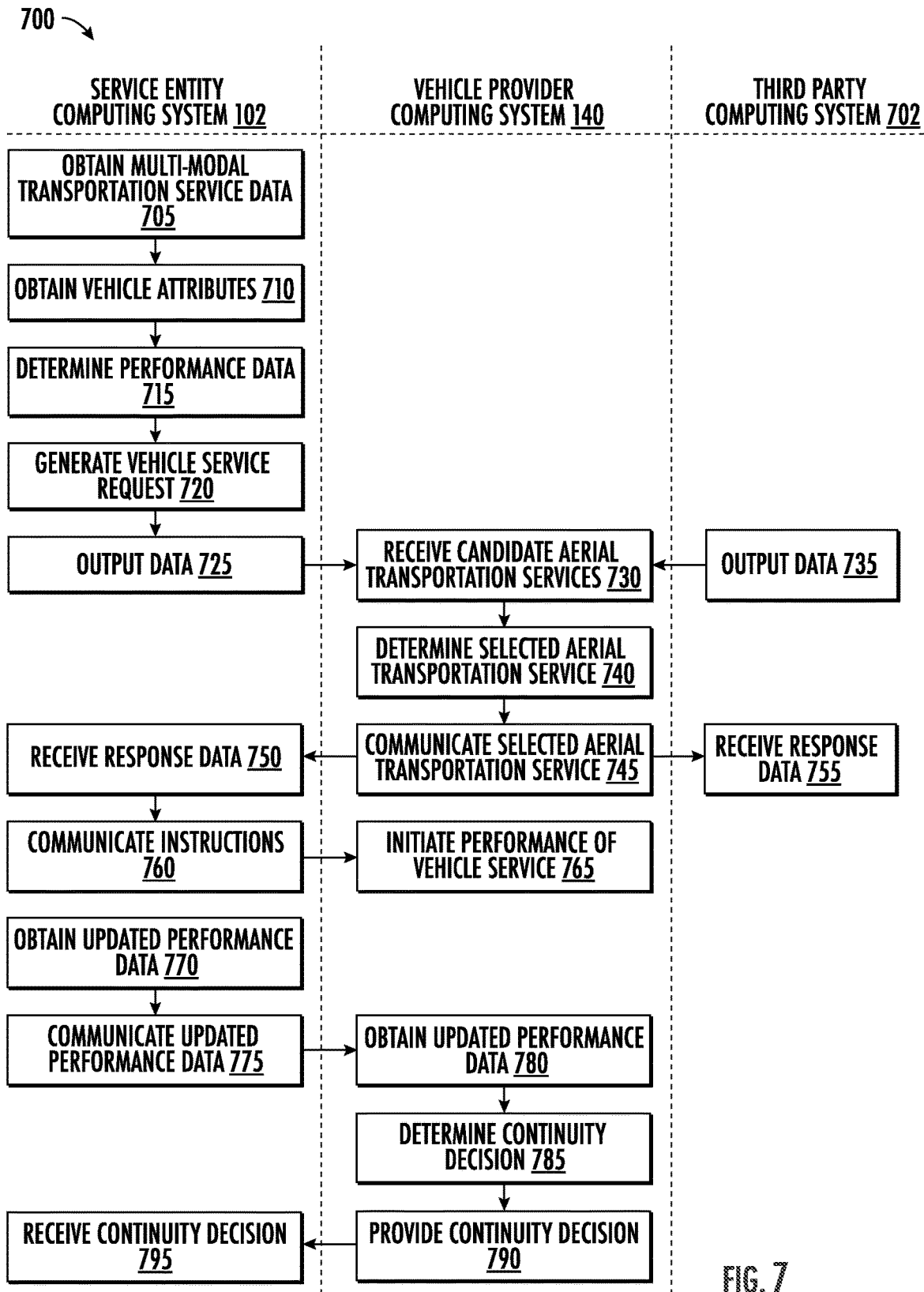
FIG. 7 depicts an activity diagram for facilitating an aerial vehicle service according to example embodiments of the present disclosure.

FIG. 7 depicts an activity diagram 700 for facilitating an aerial vehicle service according to example embodiments of the present disclosure. As depicted, a vehicle provider computing system 140 can interact with a service entity computing system 102 and third-party computing system 702. The service entity computing system 102 can include the service entity computing system 102 of FIG. 1. The third-party computing system 702 can include another service entity computing system different from the service entity computing system 102. For example, the third-party computing system 702 can include a ride-sharing platform configured to facilitate aerial transportation services for one or more users of the platform. In some implementations, the third-party computing system 702 can be associated with a remote service entity that competes with the service entity of the service entity computing system 102 for aerial vehicles provided by a third-party aerial vehicle provider associated with the vehicle provider computing system 140.

The vehicle provider computing system 140 can include a computing system associated with a third-party vehicle provider (e.g., a vehicle provider 504 of FIG. 5). The vehicle provider computing system 140 can include one or more devices associated with the third-party vehicle provider. The devices, for example, can include a pilot device associated with an operator (e.g., pilot, remote operator, etc.) of one or more of the vehicles of the third-party vehicle provider. In addition, or alternatively, the devices can include a vehicle device (e.g., a vehicle computing system) of one or more of the vehicles of the third-party vehicle provider. And, in some implementations, the vehicle provider computing system 140 can include a computing system associated with the third-party vehicle provider that is configured to maintain, manage, and/or coordinate the one or more vehicles of the vehicle provider.

The service entity computing system 102 can generate a vehicle service request in the manner described herein. For instance, at (705), the service entity computing system 102 can obtain multi-modal transportation service data. At (710), the service entity computing system 102 can obtain one or more vehicle attributes associated with one or more vehicles of the vehicle provider associated with the vehicle provider computing system 140. As (715), the service entity computing system 102 can determine performance data for the one or more vehicles based on the one or more vehicle attributes and the multi-modal transportation services data. At (720), the service entity computing system 102 can generate the vehicle service request for the vehicle provider based on the performance data. At (725), the service entity computing system 102 can output data indicative of the aerial vehicle service request for the aerial vehicle provider.

At (730), the vehicle provider computing system 140 can obtain data indicative of a candidate aerial transportation service for one or more aerial vehicles of the aerial service provider. In this respect, the aerial vehicle provider (e.g., a vehicle provider computing system 140 of the aerial vehicle provider) can obtain a plurality of aerial transportation service requests from one or more different service entities (e.g., service entity computing system 102, third-party computing system 702, etc.). For example, the vehicle provider computing system 140 and/or a device thereof (e.g., a pilot device, vehicle device, vehicle provider device, etc.) can obtain data indicative of a first candidate aerial transportation service for one or more aerial vehicles of the aerial vehicle provider. The first candidate aerial transportation service, for example, can be associated with a first service entity. For example, the first candidate aerial transportation service can include the data indicative of the aerial vehicle service request described above (e.g., output at 725). The first candidate aerial transportation service can be associated with the provision of one or more multi-modal transportation services of the first service entity.

By way of example, the data indicative of the first candidate aerial transportation service can include an aerial vehicle service request. The aerial vehicle service request can be based, at least in part, on a predicted performance of the one or more aerial vehicles in association with the provision of the one or more multi-modal transportation services of the first service entity. The data indicative of the first candidate aerial transportation service can include data associated with the predicted performance (e.g., predicted performance data) of the one or more aerial vehicles. The predicted performance data can include one or more anticipated routes, an anticipated compensation parameter, an estimated energy usage, a payload estimation, a maintenance estimation, one or more anticipated vehicle locations, one or more anticipated times associated with the one or more anticipated locations, and/or any data discussed herein with reference to the predicted performance data.

By way of example, the one or more anticipated routes can include one or more routing parameters of the predicted performance data. For instance, the anticipated route(s) can include predicted aerial transportation routes between one or more aerial transport facilities. The anticipated routes can include one or more predicted, scheduled, etc. routes for each of the one or more multi-modal transportation services. The one or more anticipated vehicle locations can include one or more locations along the one or more anticipated routes. For instance, the one or more anticipated vehicle locations can include each aerial transport facility associated with each of the routes. The one or more anticipated times associated with the one or more anticipated locations can include one or more times at which a vehicle is expected to arrive at each of the one or more anticipated locations. For instance, the one or more anticipated locations can include an anticipated destination location at which a vehicle is expected to reach after the provision of the one or more multi-modal transportation services.

The estimated energy usage can include one or more usage parameters of the predicted performance data. For instance, the estimated energy usage can include an estimate energy expense (e.g., fuel, battery power, etc.) for providing the one or more multi-modal transportation services. The estimated energy usage can be based, at least in part, on an estimated flight time and/or an estimated down time associated with the one or more multi-modal transportation services.

The anticipated compensation parameter, payload estimation, and maintenance estimation can include one or more service parameters of the predicted performance data. For instance, the anticipated compensation parameter can include an estimated value (flat rate, per service, total compensation) for the one or more multi-modal transportation services. The anticipated compensation parameter can be based, at least in part, on a predicted number of aerial transportation services provided by the one or more vehicles of the vehicle provider.

In addition, or alternatively, the anticipated compensation parameter can be based at least in part on a payload estimation indicative of a total, average, or per aerial transportation weight transported by the aerial vehicle(s) of the vehicle provider. For example, in some implementations, the data indicative of the first candidate aerial transportation service can include a first request for a first vehicle type associated with a first compensation parameter and/or one or more second requests for a second vehicle type associated with a second compensation parameter. As an example, the first vehicle type can be associated with a higher payload capacity than the second vehicle type such that the first vehicle type can transport a larger number of passengers over an operational time period. In such a case, the compensation parameter associated with the first vehicle type can be higher than the second vehicle type. The maintenance estimation can be indicative of an estimated cost for maintenance (e.g., refueling, recharging, etc.) during the provision of the one or more multi-modal transportation services. Different types of vehicles can be defined by the different parameters of each of those vehicles.

At (730), the aerial vehicle provider can obtain data indicative of at least a second candidate aerial transportation service for the one or more aerial vehicles of the aerial vehicle provider. For example, at (735), the third-party computing system 702 can output the data indicative of at least a second candidate aerial transportation service for the one or more aerial vehicles of the aerial vehicle provider. The second candidate aerial transportation service can be associated with a second service entity (e.g., associated with the third-party computing system 702). The second service entity can be different service entity from the first service entity. The second service entity, for example, can include the aerial vehicle provider, one or more other third-party service providers, etc. For instance, the second service entity can include the aerial vehicle provider and the second candidate aerial transportation service can include an internal transportation schedule for one or more aerial vehicles of the aerial vehicle provider. As another example, the second service entity can include one or more other third-party service providers such as another service entity configured to manage, coordinate, and/or dynamically adjust aerial transportation services via another transportation platform.

At (740), the vehicle provider computing system 140 of the aerial vehicle provider can determine a selected aerial transportation service for the one or more aerial vehicles of the aerial vehicle provider based, at least in part, on the first candidate aerial transportation service and the second candidate aerial transportation service. For example, the selected aerial transportation service can include a portion of the first candidate transportation service and/or the second candidate transportation service.

A portion of a candidate aerial transportation service, for example, can include at least one of a portion of a time commitment, a portion of a number of trips, etc. For example, each candidate aerial transportation service can include a time commitment indicative of one or more hours, days, weeks, etc. for which one or more aerial vehicles of the vehicle provider can provide one or more aerial transportation services for a respective service entity. In such a case, a portion of the candidate aerial transportation service can include a temporal portion (e.g., a portion of a day, a particular day of a week, etc.) of the time commitment.

As another example, each candidate aerial transportation service can include a trip commitment indicative of one or more aerial transportation services for which one or more aerial vehicles of the vehicle provider can provide for a respective service entity. In such a case, a portion of the candidate aerial transportation service can include a portion of the number of trips.

In some implementations, the candidate aerial transportation service can include one or more other service entity features and/or vehicle provider features (e.g., as discussed herein). A portion of the candidate aerial transportation service can include any one of the one or more service entity features and/or vehicle provider features. By way of example, the vehicle provider computing system 140 can reject and/or accept any of a charging commitment, maintenance commitment, etc. for the service entity or vehicle provider included in the data indicative of the candidate aerial transportation service.

By way of example, the aerial computing system can determine the selected aerial transportation service by accepting at least a portion of the first candidate aerial transportation service associated with the first service entity and rejecting at least a portion of the second candidate aerial transportation service associated with the second service entity. In addition, or alternatively, the aerial computing system can reject at least a portion of the first candidate aerial transportation service associated with the first service entity and accept at least a portion of the second candidate aerial transportation service associated with the second service entity. As another example, the aerial computing system can accept at least a portion of the first candidate aerial transportation service associated with the first service entity and accept at least a portion of the second candidate aerial transportation service associated with the second service entity. In this manner, the aerial computing system can mix and match one or more portions of each of a plurality of candidate transportation services to obtain an optimal selected aerial transportation service.

The vehicle provider computing system 140 can determine the selected aerial transportation service to prevent any overlap between each of the candidate aerial transportation services. For example, the vehicle provider computing system 140 can determine the selected aerial transportation service based, at least in part, on the time commitment and/or trip commitment of each of the candidate aerial transportation services and the vehicle provider attributes associated with the aerial vehicle provider. By way of example, the vehicle provider computing system 140 can compare the size of the fleet of aerial vehicles of the aerial vehicle provider to the number of aerial vehicles requested by each of the service entities, times during which the aerial vehicles are requested, and/or a number of trips for which they are requested. The vehicle provider computing system 140 can accept a portion of one or more of the candidate transportation services such that the fleet of vehicles associated with the vehicle provider can complete the accepted vehicle services (e.g., no overlap between commitments of each accepted portion of the candidate transportation services).

At (745), the vehicle provider computing system 140 can communicate data indicative of the selected aerial transportation service to another computing system. The computing system can depend on the selected aerial transportation service. For example, the vehicle provider computing system 140 can communicate data indicative of the selected aerial transportation service to the service entity computing system 102 associated with the first service entity in the event that the selected aerial transportation service includes at least a portion of the first candidate aerial transportation service associated with the first service entity. In addition, or alternatively, the vehicle provider computing system 140 can communicate data indicative of the selected aerial transportation service to the third-party computing system 702 associated with the second service entity in the event that the selected aerial transportation service includes at least a portion of the second candidate aerial transportation service associated with the second service entity.

For example, the data can include response data indicative of one or more portions of the data indicative of the candidate transportation services. For instance, the response data can identify one or more aerial vehicles of the vehicle provider, one or more time periods during which the aerial vehicle(s) will go online with the service entity or third-party service entity, and/or one or more aerial transportation services for which the one or more aerial vehicle(s) can be utilized by service entity or third-party service entity. By way of example, the response data can include a plurality of vehicle identifiers indicative of a plurality of aerial vehicles of the vehicle provider. For each aerial vehicle, the response data can indicate a period of time for which the vehicle will go online (e.g., provide transportation services for) with the service entity and/or third-party service entity. In some implementations, for each vehicle, the response data can indicate one or more scheduled and/or anticipated transportation services for which each of the vehicles can provide.

In this manner, at (750), the service entity computing system 102 can receive response data indicative of at least one of an acceptance and/or a rejection of the first candidate transportation services. In addition, or alternatively, at (755), the third-party computing system 702 can receive response data indicative of at least one of an acceptance and/or a rejection of the second candidate transportation services.

The vehicle provider computing system 140 can facilitate communication between the one or more aerial vehicles and a remote computing system for the one or more aerial vehicles to perform the selected aerial transportation service. For example, the selected aerial transportation service can include at least a portion of the first candidate aerial transportation service associated with the first service entity. In such a case, the vehicle provider computing system 140 can access an application programming interface associated with the first service entity. Using the application programming interface, the vehicle provider computing system 140 can generate a message indicating that the one or more aerial vehicles are or will be online with the first service entity. The vehicle provider computing system 140 can communicate the message indicating that the one or more aerial vehicles are or will be online with the first service entity based, at least in part, on the application programming interface.

The service entity computing system 102 associated with the first entity can communicate, via the application programming interface, with the one or more aerial vehicles while the one or more aerial vehicles are online with the first service entity. For example, while online, the one or more aerial vehicles of the vehicle provider can have access to one or more of the backend services (e.g., the world state service, forecasting service, optimization planning service, matching and fulfillment services, etc.) of the service entity. In addition, or alternatively, the one or more backend services can have access to the one or more aerial vehicles such as, for example, to assign a vehicle, via the matching and fulfillment service, to provide an aerial transportation service. In this manner, the vehicle provider computing system 140 can facilitate communication between the one or more aerial vehicles and/or other computing devices associated with the service entity to facilitate the provision of the selected aerial transportation services.

For example, at (760) the service entity computing system 102 can communicate instructions to the vehicle provider computing system 140. At (765), the vehicle provider computing system 140 can obtain the one or more instructions for performing the portion of the first candidate aerial transportation service. The portion of the first candidate aerial transportation service can include one or more aerial transportation legs of the one or more multi-modal transportation services. For example, the first candidate aerial transportation service (e.g., the aerial vehicle service request described herein) can include one or more instructions for performing an aerial transportation leg of a respective multi-modal transportation service of one or more multi-modal transportation services (e.g., of the multi-modal transportation service data). The vehicle provider computing system 140 can initiate the provision of the one or more aerial transportation legs of the one or more multi-modal transportation services of the first service entity based, at least in part, on the one or more instructions for performing the portion of the first candidate aerial transportation service.

At (780), the vehicle provider computing system 140 can obtain updated predicted performance data during the provision of the one or more aerial transportation legs of the one or more multi-modal transportation services of the first service entity. By way of example, at (770), the service entity computing system 102 can obtain the updated performance data. For instance, the service entity computing system 102 can obtain tracking data for the at least one of the one or more aerial transportation legs. The tracking data can be indicative of a progress of the at least one of the one or more aerial transportation legs. The tracking data, for example, can include real-time data (e.g., obtained via one or more sensors, input to one or more devices (e.g., pilot device, aerial facility device, user device, etc.) associated with a multi-modal transportation service, etc.) indicative of the real-time performance of the at least one of the one or more aerial transportation legs.

The service entity computing system 102 can determine updated predicted aerial vehicle performance data associated with the one or more aerial transportation legs based, at least in part, on the tracking data. By way of example, the service entity computing system 102 can modify an expected flight time based on one or more flight delays, increase a compensation parameter based on an increased number of anticipated transportation service requests, decrease a number of anticipated aerial transportation services based on inclement weather, etc. The service entity computing system 102 can update the first portion of the predicted aerial vehicle performance data of the aerial vehicle service request based on the tracking data and, at (775), output data indicative of the updated aerial vehicle service request to one or more computing devices (e.g., the vehicle provider computing system 140) associated with the aerial vehicle service request.

In this manner, at (780) the vehicle provider computing system 140 and/or one or more devices associated therewith can obtain updated predicted performance data. The updated predicted performance data can include updated routes, updated compensation parameters, updated energy usages, updated payload estimates, updated maintenance estimates, and/or one or more updated vehicle locations or one or more updated times associated with the one or more updated vehicle locations. At (785), the vehicle provider computing system 140 can determine a continuity decision based, at least in part, on the updated predicted performance data. The continuity decision can be indicative of a decision to continue the provision of the one or more aerial transportation legs of the one or more multi-modal transportation services of the first service entity or discontinue the provision of the one or more aerial transportation legs of the one or more multi-modal transportation services of the first service entity.

At (790), the vehicle provider computing system 140 can communicate data indicative of the continuity decision to a computing system (e.g., the service entity computing system 102) associated with the first service entity. At (795), the service entity computing system 102 can receive the data indicative of the continuity decision. In some implementations, the data indicative of the continuity decision can be stored (e.g., as historical data associated with the service provider) and used to update one or more preferences associated with the vehicle provider.

In some implementations, the vehicle provider computing system 140 can reject and/or discontinue at least a portion of the first candidate aerial transportation service associated with the first service entity. In response, the first service entity computing system 102 can obtain feedback information (e.g., indicative of the rejection and/or one or more reasons for the rejection) associated with the rejection. For example, the first service entity computing system 102 can request the feedback information in response to the rejection. The vehicle provider computing system 140 can provide the feedback data to a first service entity computing system 102 associated with the first service entity. The feedback data can be indicative of one or more reasons for rejecting the first candidate aerial transportation service, one or more aspects (e.g., service entity features, service provider features, performance portion, etc.) of the aerial vehicle service request associated with the first candidate aerial transportation service, an accepted portion of the second candidate aerial transportation service associated with the second service entity, etc.

The service entity computing system 102 can receive the feedback data and store the data (e.g., as historical data)

associated with the aerial vehicle provider. As described herein, such data can be utilized to determine one or more vehicle preferences associated with the aerial vehicle provider. The one or more vehicle preferences can be utilized to generate targeted, vehicle provider specific, aerial transportation service requests. In addition, or alternatively, the service entity computing system 102 can utilize the feedback data and/or one or more vehicle preferences to update the aerial vehicle service request associated with the first candidate aerial transportation service and provide the updated aerial vehicle service request associated with the first candidate aerial transportation service to the aerial vehicle provider computing system 140.

Turning to FIG. 8, FIG. 8 depicts a flow diagram 800 of an example method for generating a vehicle service request according to aspects of the present disclosure. One or more portion(s) of the method 800 can be implemented by a computing system that includes one or more computing devices such as, for example, the computing systems described with reference to the other figures (e.g., service entity computing system 102, the computing system 605, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 5, 6, 10, etc.), for example, to generate a vehicle service request. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining multi-modal transportation service data associated with a service entity. For example, the computing system (e.g., service entity computing system 102, computing system 605, etc.) can obtain the multi-modal transportation service data associated with the service entity. The multi-modal transportation service data can be indicative of one or more multi-modal transportation services associated with one or more aerial transportation legs. Each of the one or more multi-modal transportation services can include at least two transportation legs, each of the at least two transportation legs can include a respective aerial transportation leg of the one or more aerial transportation legs.

At 810, the method 800 can include obtaining one or more aerial vehicle attributes associated with one or more aerial vehicles. For example, the computing system (e.g., service entity computing system 102, computing system 605, etc.) can obtain the one or more aerial vehicle attributes associated with the one or more aerial vehicles. The one or more aerial vehicles can be associated with an aerial vehicle provider.

At 815, the method 800 can include determining, for the one or more aerial vehicles, predicted aerial vehicle performance data associated with the one or more aerial transportation legs of the one or more multi-modal transportation services based, at least in part, on the multi-modal transportation service data and the one or more vehicle attributes. For example, the computing system (e.g., service entity computing system 102, computing system 605, etc.) can determine, for the one or more aerial vehicles, the predicted aerial vehicle performance data associated with the one or more aerial transportation legs of the one or more multi-modal transportation services based, at least in part, on the multi-modal transportation service data and the one or more vehicle attributes.

At 820, the method 800 can include generating an aerial vehicle service request for the aerial vehicle provider based, at least in part, on the predicted aerial vehicle performance data. For example, the computing system (e.g., service entity computing system 102, computing system 605, etc.) can generate the aerial vehicle service request for the aerial vehicle provider based, at least in part, on the predicted aerial vehicle performance data. The aerial vehicle service request can include a request for at least one of the one or more aerial vehicles associated with the aerial vehicle provider to provide an aerial transportation service for at least one of the one or more aerial transportation legs.

At 825, the method 800 can include outputting data indicative of the aerial vehicle service request for the aerial vehicle provider. For example, the computing system (e.g., service entity computing system 102, computing system 605, etc.) can output data indicative of the aerial vehicle service request for the aerial vehicle provider.

FIG. 9 depicts a flow diagram 900 of an example method for selecting a vehicle service request according to aspects of the present disclosure. One or more portion(s) of the method 900 can be implemented by a computing system that includes one or more computing devices such as, for example, the computing systems described with reference to the other figures (e.g., vehicle provider computing system(s) 140, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 5, 6, 10, etc.), for example, to select a vehicle service request. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 can include obtaining data indicative of a first candidate aerial transportation service for one or more aerial vehicles of an aerial vehicle provider. For example, a computing system (e.g., vehicle provider computing system(s) 140, etc.) can obtain data indicative of a first candidate aerial transportation service for the one or more aerial vehicles of the aerial vehicle provider. The first candidate aerial transportation service can be associated with a first service entity. For example, the first candidate aerial transportation service can be associated with the provision of one or more multi-modal transportation services of the first service entity.

At 910, the method 900 can include obtaining data indicative of a second candidate aerial transportation service for the one or more aerial vehicles of the aerial vehicle provider. For example, the computing system (e.g., vehicle provider computing system(s) 140, etc.) can obtain data indicative of a second candidate aerial transportation service for the one or more aerial vehicles of the aerial vehicle provider. The second candidate aerial transportation service can be associated with a second service entity different from the first service entity.

At 915, the method 900 can include determining a selected aerial transportation service for the one or more aerial vehicles of the aerial vehicle provider based at least in part on the first candidate aerial transportation service and the second candidate aerial transportation service. For example, the computing system (e.g., vehicle provider computing system(s) 140, etc.) can determine the selected aerial transportation service for the one or more aerial vehicles of the aerial vehicle provider based at least in part on the first candidate aerial transportation service and the second candidate aerial transportation service.

At 915, the method 900 can include communicating data indicative of the selected aerial transportation service to a respective service entity. For example, the computing system (e.g., vehicle provider computing system(s) 140, etc.) can communicate the data indicative of the selected aerial transportation service. The selected aerial transportation service can include at least one portion of the first and/or second candidate aerial transportation services. The data indicative of the selected aerial transportation service can indicate the at least one portion of the first and/or second candidate aerial transportation services. For instance, the data indicative of the selected aerial transportation service can be communicated to a service entity associated with each of the at least one portions of the first and/or second candidate aerial transportation services.

FIG. 10 depicts example system components of an example system 1000 according to example embodiments of the present disclosure. The example system 1000 can include the computing system 1005 (e.g., service entity computing system 102, computing system 605, etc.) and the computing system 1050 (e.g., vehicle provider computing system(s) 140, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions for which the computing systems are configured, as described herein.

The memory 1020 can store data 1030 that can be obtained, received, accessed, written, manipulated, created, and/or stored. The data 1030 can include, for instance, multi-modal transportation service data, aerial vehicle attributes, predicted aerial vehicle performance data, etc. as described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, data indicative of a first, second, etc. candidate aerial transportation service, data indicative of a selected aerial transportation service and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at an operations computing system can instead be performed remote from the operations computing system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
   accessing, by a computing system comprising one or more computing devices, aerial transportation service data indicative of one or more aerial transportation services;
   accessing, by the computing system, aerial vehicle attribute data associated with one or more aerial vehicles;
   computing, by the computing system, predicted aerial vehicle performance data for the one or more aerial transportation services based at least in part on the aerial transportation service data and the aerial vehicle attribute data;
   computing, by the computing system, an aerial vehicle service request based at least in part on the predicted aerial vehicle performance data, wherein the aerial vehicle service request comprises a request for at least one of the one or more aerial vehicles to provide an aerial transportation service; and
   outputting, by the computing system, data indicative of the aerial vehicle service request.

2. The computer-implemented method of claim 1, wherein the aerial transportation service data comprises request data indicative of a plurality of requests for the one or more aerial transportation services, wherein the plurality of requests comprise one or more anticipated requests, one or more incoming requests, or one or more scheduled requests.

3. The computer-implemented method of claim 2, wherein the aerial transportation service data comprises itinerary data indicative of a plurality of aerial transportation itineraries for facilitating the one or more aerial vehicle transportation services for the plurality of requests.

4. The computer-implemented method of claim 3, wherein the itinerary data comprises one or more itinerary attributes associated with the plurality of aerial transportation itineraries, wherein the one or more itinerary attributes comprise one or more time constraints and one or more location constraints.

5. The computer-implemented method of claim 4, wherein the predicted aerial vehicle performance data is based, at least in part, on a comparison of the one or more itinerary attributes and the one or more aerial vehicle attributes associated with the one or more aerial vehicles.

6. The computer-implemented method of claim 1, wherein the predicted aerial vehicle performance data is indicative of one or more transportation parameters associated with the one or more aerial transportation services.

7. The computer-implemented method of claim 6, wherein the one or more transportation parameters associated with the one or more aerial transportation services comprise one or more usage parameters indicative of a flight time, or one or more routing parameters indicative of one or more predicted routes, or both.

8. The computer-implemented method of claim 6, wherein the aerial vehicle service request comprises data indicative of at least a first performance portion of the predicted aerial vehicle performance data, wherein the first performance portion of the predicted aerial vehicle performance data is indicative of a first subset of one or more transportation parameter types associated with the one or more transportation parameters of the one or more aerial transportation services.

9. The computer-implemented method of claim 8, wherein computing the aerial vehicle service request comprises computing, by the computing system, the aerial vehicle service request based, at least in part, on the first performance portion of the predicted aerial vehicle performance data.

10. The computer-implemented method of claim 9, wherein an aerial vehicle provider for the aerial vehicle service request is one of a plurality of aerial vehicle providers associated with a service entity, and wherein the method further comprises:
    generating, by the computing system, a second aerial vehicle service request for a second aerial vehicle provider of the plurality of aerial vehicle providers based, at least in part, on second predicted aerial vehicle performance data associated with the second aerial vehicle provider and the aerial transportation service data.

11. The computer-implemented method of claim 10, wherein the second aerial vehicle service request comprises data indicative of at least a second performance portion, the second performance portion indicative of a second subset of one or more different transportation parameter types than the first performance portion.

12. The computer-implemented method of claim 11, wherein the first performance portion of the aerial vehicle service request and the second performance portion of the second aerial vehicle service request are determined based, at least in part, on historical data associated with the aerial vehicle provider and the second aerial vehicle provider.

13. One or more tangible, non-transitory computer-readable media storing computer-readable instructions that when executed by one or more processors cause the one or more processors to perform operations, the operations comprising:
  accessing aerial transportation service data indicative of one or more aerial transportation services;
  accessing aerial vehicle attribute data associated with one or more aerial vehicles;
  computing predicted aerial vehicle performance data for the one or more aerial transportation services based at least in part on the aerial transportation service data and the aerial vehicle attribute data;
  computing an aerial vehicle service request based at least in part on the predicted aerial vehicle performance data, wherein the aerial vehicle service request comprises a request for at least one of the one or more aerial vehicles to provide an aerial transportation service; and
  outputting data indicative of the aerial vehicle service request.

14. The one or more tangible, non-transitory computer-readable media of claim 13, wherein the data indicative of the aerial vehicle service request comprises one or more instructions for performing an aerial transportation leg of a multi-modal transportation service.

15. The one or more tangible, non-transitory computer-readable media of claim 13, wherein the aerial vehicle service request comprises one or more service entity features and one or more vehicle provider features, the one or more vehicle provider features indicative of a period of operational time or a number of aerial transportation services.

16. The one or more tangible, non-transitory computer-readable media of claim 13, wherein outputting the data indicative of the aerial vehicle service request comprises:
  outputting the data indicative of the aerial vehicle service request to at least one of a pilot device associated with the at least one of the one or more aerial vehicles, a vehicle device associated with that at least one of the one or more aerial vehicles, or a vehicle provider device associated with an aerial vehicle provider.

17. The one or more tangible, non-transitory computer-readable media of claim 13, wherein the aerial vehicle service request comprises a request for at least one of the one or more aerial vehicles to provide the one or more aerial transportation services.

18. The one or more tangible, non-transitory computer-readable media of claim 17, wherein the aerial vehicle service request comprises at least a first portion of the predicted aerial vehicle performance data, and wherein the operations further comprise:
  obtaining tracking data for the one or more aerial transportation services, the tracking data indicative of a progress of the one or more aerial transportation services;
  updating the first portion of the predicted aerial vehicle performance data of the aerial vehicle service request based, at least in part, on the tracking data; and
  outputting data indicative of the updated aerial vehicle service request.

19. A computing system comprising:
  one or more processors; and
  one or more tangible, non-transitory, computer readable media that collectively store instructions that when executed by the one or more processors cause the computing system to perform operations, the operations comprising
    accessing aerial transportation service data indicative of one or more aerial transportation services,
    accessing aerial vehicle attribute data associated with one or more aerial vehicles,
    computing predicted aerial vehicle performance data for the one or more aerial transportation services based at least in part on the aerial transportation service data and the aerial vehicle attribute data,
    computing an aerial vehicle service request based at least in part on the predicted aerial vehicle performance data, wherein the aerial vehicle service request comprises a request for at least one of the one or more aerial vehicles to provide an aerial transportation service, and
    outputting data indicative of the aerial vehicle service request.

* * * * *